(12) United States Patent
Niwa et al.

(10) Patent No.: US 8,132,479 B2
(45) Date of Patent: Mar. 13, 2012

(54) SCREW DEVICE AND METHOD OF MANUFACTURING THE SAME

(75) Inventors: Hiroshi Niwa, Tokyo (JP); Akimasa Yoshida, Tokyo (JP); Soshi Miyahara, Tokyo (JP); Noriaki Chikamoto, Tokyo (JP); Yasuhiro Kubota, Tokyo (JP)

(73) Assignee: THK Co., Ltd., Tokyo (JP)

( * ) Notice: Subject to any disclaimer, the term of this patent is extended or adjusted under 35 U.S.C. 154(b) by 706 days.

(21) Appl. No.: 12/298,832

(22) PCT Filed: Apr. 27, 2007

(86) PCT No.: PCT/JP2007/059256
§ 371 (c)(1),
(2), (4) Date: Oct. 28, 2008

(87) PCT Pub. No.: WO2007/126084
PCT Pub. Date: Nov. 8, 2007

(65) Prior Publication Data
US 2009/0084212 A1    Apr. 2, 2009

(30) Foreign Application Priority Data

Apr. 28, 2006 (JP) .................................. 2006-124953
Mar. 30, 2007 (JP) .................................. 2007-091161

(51) Int. Cl.
*F16H 55/02* (2006.01)
(52) U.S. Cl. ................................................... 74/424.87
(58) Field of Classification Search ............... 74/424.71, 74/424.81, 424.82, 424.86, 424.87; 259/59; 425/116; 264/271.1, 279, 279.1
See application file for complete search history.

(56) References Cited

U.S. PATENT DOCUMENTS

| 4,342,235 A | * | 8/1982 | Benton | .................. 74/424.87 |
| 6,080,351 A | * | 6/2000 | Shirai | ....................... 264/267 |
| 6,282,971 B1 | | 9/2001 | Shirai et al. | |

(Continued)

FOREIGN PATENT DOCUMENTS
EP    1375938 A    1/2004
(Continued)

OTHER PUBLICATIONS

European Search Report dated Dec. 2, 2009, issued in corresponding European Patent Application No. 07742691.4.

(Continued)

*Primary Examiner* — Thomas R Hannon
*Assistant Examiner* — Phillip A Johnson
(74) *Attorney, Agent, or Firm* — Westerman, Hattori, Daniels & Adrian, LLP

(57) ABSTRACT

Provided is a screw device capable of preventing occurrence of any elevation change at a joint between a ball return path of a circulation member and a loaded ball rolling groove of a nut. The circulation member 12 has end parts 14 and 15 each of which the periphery includes a rolling groove connecting part 22 positioned to the side of a loaded ball rolling groove 11*a* of a nut 11 and connected to the loaded ball rolling groove 11*a* of the nut 11 and a scooping part 23 positioned to the side of a ball rolling groove of a screw shaft 1 and scoops up balls 3 from a loaded ball rolling path. The rolling groove connecting part 22 of each of the end parts 14 and 15 is made of resin and formed integral with the nut 11.

16 Claims, 26 Drawing Sheets

U.S. PATENT DOCUMENTS

2006/0027038 A1 * 2/2006 Ohkubo et al. ............ 74/424.86

FOREIGN PATENT DOCUMENTS

| EP | 1193422 | A1 | 4/2008 |
| --- | --- | --- | --- |
| GB | 897008 | A | 5/1962 |
| JP | 3-86237 | U | 8/1991 |
| JP | 6-147290 | A | 5/1994 |
| JP | 2000-18359 | A | 1/2000 |
| JP | 2002-21967 | A | 1/2002 |
| JP | 2002-106672 | A | 4/2002 |
| JP | 2003-113921 | A | 4/2003 |
| JP | 2004-353697 | A | 12/2004 |

OTHER PUBLICATIONS

International Search Report of PCT/JP2007/059256, date of mailing Jun. 5, 2007.
Written Opinion of the International Searching Authority (form PCT/ISA/237) of International Application No. PCT/JP2007/059256.

* cited by examiner (A)  (B)

BACKGROUND ART

BACKGROUND ART

BACKGROUND ART

BACKGROUND ART

SCREW DEVICE AND METHOD OF MANUFACTURING THE SAME

TECHNICAL FIELD

A. The present invention relates to a return pipe type or endcap type screw device having a screw shaft, a nut, rolling elements rolling therebetween and a circulation member such as a return pipe or an endcap for circulating the rolling elements, and its manufacturing method.

B. The present invention relates to a deflector type screw device having a screw shaft, a nut, rolling elements rolling therebetween and a deflector for returning the rolling elements one turn back to a loaded rolling-element rolling groove, and its manufacturing method.

In this description, the invention relating to the return pipe type or endcap type screw device and its manufacturing method is described with a mark of "A" and the invention relating the deflector type screw device and its manufacturing method is described with a mark of "B".

BACKGROUND ART

A. As a ball screw enables reduction of friction coefficient in rotating the screw shaft relative to the nut as compared with a sliding contact type screw, it has become commercially practical in various fields such as positioning mechanism of machine tools, vehicle steering, guide devices, motion screws and the like. As illustrated in FIG. 30, a return pipe type ball screw has a plurality of balls 3 arranged in a loaded ball rolling path between a spiral ball rolling groove 1a on the outer peripheral surface of a screw shaft 1 and a spiral loaded ball rolling groove 2a on the inner peripheral surface of a nut 2, and the balls 3 are circulated in a ball return path of a U-shaped return pipe 4 (circulation member) formed in the nut 2 (for example, see patent document 1). In the side surface of the nut 2, a return pipe insertion hole 2b is formed which extends up to the loaded ball rolling groove 2a. When a leg part 4a of the return pipe 4 is inserted in the return pipe insertion hole 2b, one end of the spiral loaded ball rolling groove 2a of the nut 2 and the other end thereof are connected via the ball return path of the return pipe 4. The plural balls 3 arranged between the nut 2 and the screw shaft 1 circulate in a ball circulation path formed of the spiral loaded ball rolling groove 2a and the ball return path in the return pipe 4.

Each ball 3 moves from the loaded ball rolling groove 2a of the nut 2 to the ball return path of the return pipe 4, and vice versa. At this time, if there is any elevation change (step height) at a joint of the loaded ball rolling groove 2a of the nut 2 and the ball return path of the return pipe 4, the ball 3 is prevented from moving smoothly. Accordingly, as shown in FIG. 31, in order to eliminate the elevation change at the joint 6 of the ball return path 5 and the loaded ball rolling groove 2a, a connecting part 7 of the loaded ball rolling groove 2a to the ball return path 5 is subjected to chamfering. Strictly speaking, in case of a ball screw using balls as rolling elements, the cross section of the loaded ball rolling groove 2a is shaped like Gothic arch composed of two arcs so that each of the balls is in contact with the loaded ball rolling groove 2a at two points. On the other hand, the cross section of the ball return path 5 is shaped like a single arc. The connecting part 7 is also chamfered so that the cross section of the loaded ball rolling groove 2a is changed gradually to conform to the cross section of the ball return path 5 at the joint 6 thereof.

[Patent Document 1] Japanese Patent Laid-open Publication No. 2000-18359

B. FIG. 32 illustrates a deflector type ball screw. A nut 71 has a side surface, in which a deflector hole 72 is formed. A deflector 73 is fit in the deflector hole 72. The deflector 73 has an S-shaped return groove 73a formed therein connecting both ends of a spiral loaded ball rolling groove 71a of less than one turn formed in the inner peripheral surface of the nut 71. This return groove 73a acts to move each ball 75 away from a ball rolling groove 76a of a screw shaft 76, make the ball 75 go over a thread 76b of the screw shaft 76 and return the ball 75 one turn back to the ball rolling groove 76a. The deflector 73 is a resin molding, and it is fit in the deflector hole 72 of the nut 71 and secured to the nut 71 by an adhesive agent.

Meanwhile, the applicant has proposed a wing type deflector 82 which can be inserted into a nut 81 without any adhesive agent, as shown in FIG. 33 (see the patent document 2). The wing type deflector 82 has a deflector main body 82a having a return groove 82c formed therein and a wing part 82b which juts from a side surface of the deflector main body 82a and fits into the loaded ball rolling groove 81a of the nut 81. Between the return groove 82c of the deflector 82 and the screw shaft 84, there are balls 85 arranged so that the deflector 82 is prevented from falling into the screw shaft 84 side.

[Patent Document 2] Japanese Patent Laid-open Publication No. 2002-106672

DISCLOSURE OF INVENTION

Problems to be Solved by the Invention

A. However, even if the loaded ball rolling groove 2a and the ball return path 5 are designed to eliminate the elevation change therebetween by chamfering, sometimes the U-shaped return pipe 4 is not manufactured as designed due to resin molding and bending, and paired legs 4a of the return pipe 4 may be deformed more inwardly or outwardly than designed. Besides, when an insertion hole 2b of the return pipe 4 is formed from the side surface of the nut 2 toward the loaded ball rolling groove 2a, the return pipe insertion hole 2b is difficult to form straight. This is because the loaded ball rolling groove 2a side of the return pipe insertion hole 2b is thicker and the opposite side thereto is thinner so that if the return pipe insertion hole 2b is tried to be formed straight, a drill is likely to move toward the thinner side. Accordingly, the return pipe insertion hole 2b is difficult to form as designed. Such forming errors of the return pipe 4 and the return pipe insertion hole 2b may cause elevation change at the joint 6.

When the elevation change is caused at the joint 6, smooth movement of the balls from the loaded ball rolling groove 2a to the ball return path 5 is prevented. Particularly, in a ball screw having spacers between balls 3, not only the balls 3 but also the spacers are caught in the elevation change. If the spacer is caught in the elevation change, the spacer is not able to control a space between balls 3, which causes circulation failure of the balls 3.

Then, the present invention has an object to provide a screw device capable of preventing occurrence of any elevation change at a joint between the loaded ball rolling groove of the nut and the ball return path of the circulation member and a method of manufacturing the same.

B. However, in a screw device having a deflector mounted on the nut, loads from the balls 75 may be repeatedly put on the deflector 73, and coolant, cutting oil and the like may be splashed on the deflector 73, resulting in reduction of strength of the adhesive agent.

In addition, as it is necessary to insert the deflector 73 into the deflector hole 72 before adhesion, the outer shape of the deflector 73 is slightly smaller than the deflector hole 72. Hence, as shown in FIG. 34, there is a small space between the deflector 73 and the inner wall surface of the deflector hole 72. As the operation of adhering the deflector 73 to the nut 71 is performed manually by human operators, the deflector 73 is sometimes misaligned. This may causes a space or elevation change at the joint 78 of the loaded ball rolling groove 71a of the nut 71 and the return groove 73a of the deflector 73.

For a wing-type deflector 82, as shown in FIG. 35, there is a space formed between the deflector 82 and a deflector hole 88 so that the deflector can swing during operation. Swinging of the deflector 82 makes it possible to reduce bumps of the balls into the deflector 82. However, when the deflector 82 has swung, or being inclined, from the state indicated by the slid line in the figure to the state indicated by the broken line in the figure, there occur a space, elevation change and the like at the joint 86 of the return groove 82c of the deflector 82 and the loaded ball rolling groove 81a of the nut 81. The elevation change and space at the joint may prevent smooth movement of the balls.

Further, in the wing-type deflector 82, the balls 85 interposed between the screw shaft 84 and the return groove 82c of the deflector 82 act to prevent the deflector 82 from falling toward the screw shaft 84. However, just when paired adjacent balls 85 are moving over one side face of a thread, the deflector 82 slightly falls toward the screw shaft 84 side. When the deflector 82 falls toward the screw shaft 84, there occurs an elevation change at the joint 86 between the return groove 82c of the deflector 82 and the loaded ball rolling groove 81a of the nut 81, and the balls 85 bump into the end part of the return groove 82c of the deflector 82. In order to prevent this, clearance is formed at the end part of the return groove 82c so that when the deflector 82 falls toward the screw shaft 84, the balls 85 do not bump into the end part of the return groove 82c. However, if the clearance is formed at the end part of the return groove 82c, when the deflector 82 is raised, the clearance formed for preventing the elevation change may cause another elevation change.

Then, the present invention has an object to provide a screw device capable of preventing occurrence of an elevation change at a joint between the loaded ball rolling groove of the nut and the ball return groove of the deflector and a method of manufacturing the same.

Means for Solving the Problem

The present invention will now be described as follows.

In order to solve the above-mentioned problems, the invention of a first example is a screw device comprising: a screw shaft having an outer peripheral surface with a rolling-element rolling groove spirally formed thereon; a nut having an inner peripheral surface with a loaded rolling-element rolling groove spirally formed thereon facing the rolling-element rolling groove of the screw shaft; a circulation member having a rolling-element return path connecting one end of the loaded rolling-element rolling groove of the nut with an opposite end thereof; and a plurality of rolling elements arranged in the rolling-element return path of the circulation member and a loaded rolling-element rolling path between the rolling-element rolling groove of the screw shaft and the loaded rolling-element rolling groove of the nut, the rolling elements rolling in the loaded rolling-element rolling path, being scooped up at an end part of the circulation member and returned into the loaded rolling-element rolling path by an opposite end part of the circulation member, the end part of the circulation member having an periphery including a rolling groove connecting part which is positioned to a side of the loaded rolling-element rolling groove of the nut and connected to the loaded rolling-element rolling groove of the nut and a scooping part which is positioned to a side of the rolling-element rolling groove of the screw shaft and scoops up the rolling elements from the loaded rolling-element rolling path, and at least the rolling groove connecting part of the end part being made of resin and formed integral with the nut.

The invention of a second example includes that, in the screw device of the first example, the scooping part of the end part of the circulation member is made of resin and formed integral with the rolling groove connecting part.

The invention of a third example includes that, in the screw device of the first or second examples, the nut has a side surface having a through hole formed therein which reaches the loaded rolling-element rolling groove of the nut, and at least the rolling groove connecting part of the end part of the circulation member is formed integral with an inner peripheral surface of the through hole.

The invention of a fourth example includes that, in the screw device of the third example, a space is formed between the inner peripheral surface of the through hole and an outer peripheral surface of the scooping part of the end part so that a die is inserted into the space.

The invention of a fifth example includes that, in the screw device of the third or fourth examples, each of the end parts juts from the through hole, the circulation member has a connecting part which connects the end parts of the circulation member each jutting from the through hole, and the connecting part has a connecting return path formed therein connecting rolling-element return paths of the end parts.

The invention of a sixth example includes that, in the screw device of any one of the first through fifth examples, a spacer is interposed to prevent contact between the rolling elements.

The invention of a seventh example includes that, in the screw device of the first or second examples, the circulation member is a deflector mounted on the nut for returning the rolling elements on the loaded rolling-element rolling path one turn back to the rolling element rolling groove, the nut has a deflector hole formed therein which reaches the loaded rolling-element rolling groove of the nut, and at least the rolling groove connecting part of the end part of the deflector is formed integral with an inner surface of the deflector hole.

The invention of an eighth example is a method of manufacturing a screw device having: a screw shaft having an outer peripheral surface with a rolling-element rolling groove spirally formed thereon; a nut having an inner peripheral surface with a loaded rolling-element rolling groove spirally formed thereon facing the rolling-element rolling groove of the screw shaft; a circulation member having a rolling-element return path connecting one end of the loaded rolling-element rolling groove of the nut with an opposite end thereof; and a plurality of rolling elements arranged in the rolling-element return path of the circulation member and a loaded rolling-element rolling path between the rolling-element rolling groove of the screw shaft and the loaded rolling-element rolling groove of the nut, the rolling elements rolling in the loaded rolling-element rolling path, being scooped up at an end part of the circulation member and returned into the loaded rolling-element rolling path by an opposite end part of the circulation member, the end part of the circulation member having an periphery including a rolling groove connecting part which is positioned to a side of the loaded rolling-element rolling groove of the nut and connected to the loaded rolling-element rolling groove of the nut and a scooping part which is positioned to a side of the rolling-element rolling groove of the screw shaft and scoops up the rolling elements from the loaded rolling-element rolling path, the method comprising: inserting the nut into a die to form at least the rolling groove connecting part of the end part integral with the nut by resin insert molding.

The invention of a ninth example includes that, in the method of the eighth example, the scooping part of the end part of the circulation member is formed integral with the rolling groove connecting part with resin.

The invention of a tenth example includes that, in the method of the eighth or ninth examples, a through hole is formed in a side surface of the nut so as to reach the loaded rolling-element rolling groove of the inner peripheral surface of the nut, and at least the rolling groove connecting part of the end part of the circulation member is formed integral with an inner surface of the through hole.

The invention of an eleventh example includes that, in the method of any one of the eighth to tenth examples, the die includes a nut inside die which is placed inside the nut to form the end part of the circulation member jutting inside the nut.

The invention of a twelfth example includes that, in the method of any one of the eighth through eleventh examples, the die includes a pin shaped die which is inserted in a through hole formed in a side surface of the nut to form the rolling-element return path of the end part of the circulation member.

The invention of a thirteenth example includes that, in the method of any one of the eighth through twelfth examples, the die includes a cross-sectionally arc shaped die which is inserted in a through hole formed in a side surface of the nut to form a scooping-part-side outer peripheral surface of an outer peripheral surface of the end part of the circulation member.

The invention of a fourteenth example includes that, in the method of any one of the eighth through twelfth examples, the rolling groove connecting part of the end part of the circulation member is formed of resin and integral with the nut before the rolling groove connecting part and the loaded rolling-element rolling groove of the nut are subjected to cutting and grinding.

The invention of a fifteenth example is a screw device comprising: a screw shaft having an outer peripheral surface with a rolling-element rolling groove spirally formed thereon; a nut having an inner peripheral surface with a loaded rolling-element rolling groove spirally formed thereon facing the rolling-element rolling groove of the screw shaft; a deflector having a return groove connecting one end of the loaded rolling-element rolling groove of less than one turn of the nut with an opposite end thereof; and a plurality of rolling elements arranged in a rolling-element circulation path of one turn including the return groove and the loaded rolling-element rolling groove of less than one turn, the rolling elements rolling in a loaded rolling-element rolling path between the rolling-element rolling groove of the screw shaft and the loaded rolling-element rolling groove of less than one turn of the nut and being circulated via the deflector, wherein the deflector is made of resin and is formed integral with the nut so as to prevent occurrence of elevation change at a joint of the loaded rolling-element rolling groove of the nut and the return groove of the deflector.

The invention of a sixteenth example is a method of manufacturing a nut having an inner peripheral surface with a loaded rolling-element rolling groove of less than one turn spirally formed thereon n such a manner as to be integral with a deflector of resin having a return groove connecting one end of the loaded rolling-element rolling groove of less than one turn of the nut with an opposite end thereof, the method comprising: a deflector hole forming step of forming in the nut a deflector hole which conforms to a shape of the deflector; a die mounting step of inserting into the nut an inner die having a groove fitting convex part which conforms to a shape of the loaded rolling-element rolling groove of the nut and a return groove convex part which is continuous to the groove fitting convex part and is for forming the return groove of the deflector, and of fitting the groove fitting convex part of the inner die into the loaded rolling-element rolling groove of the nut; and a forming step of performing injection-molding of resin in the deflector hole of the nut to which the inner die is inserted.

The invention of a seventeenth example is a method of manufacturing a nut having an inner peripheral surface with a loaded rolling-element rolling groove of less than one turn spirally formed thereon in such a manner as to be integral with a deflector of resin having a return groove connecting one end of the loaded rolling-element rolling groove of less than one turn of the nut with an opposite end thereof, the method comprising: a deflector hole forming step of forming in the nut a deflector hole which conforms to a shape of the deflector; a die mounting step of inserting into the nut an inner die having a hole fitting convex part which conforms to a shape of the deflector hole of the nut and a return groove convex part which is provided in the hole fitting convex part to form the return groove of the deflector, and of fitting the hole fitting convex part of the inner die into the deflector hole of the nut; and a forming step of performing injection-molding of resin in the deflector hole of the nut to which the inner die is inserted.

The invention of an eighteenth example includes that in the method of the sixteenth or seventeenth examples, in the deflector hole forming step, the deflector hole is formed passing through the nut from an inner peripheral side to an outer peripheral side thereof; in the die mounting step, an outer die is mounted on an outer side of the nut; and in the forming step, the resin is injected into the deflector hole of the nut on which the inner die and the outer die are mounted.

Effects of the Invention

According to the invention of the above first example, as the rolling groove connecting part of the circulation member is formed integral with the nut, it becomes possible to prevent occurrence of elevation change between the loaded rolling-element rolling groove of the nut and the rolling groove connecting part of the circulation member.

According to the invention of the above second example, as the scooping part of the circulation member is prevented from being misaligned relative to the nut, it becomes possible to scoop the rolling elements from the loaded rolling-element rolling path smoothly.

According to the invention of the above third example, it becomes possible to prevent occurrence of elevation change between the loaded rolling-element rolling groove of the nut and the rolling groove connecting part of the circulation member even if there is variation in forming accuracy of the through hole.

According to the invention of the above fourth example, it becomes possible to form the scooping part of the circulation member in the through hole of the nut.

According to the invention of the above fifth example, it is possible to form the connecting return path in the circulation member for circulation the rolling elements.

According to the invention of the above sixth example, the spacer interposed between the rolling elements smoothly move from the loaded rolling-element rolling groove of the nut to the rolling groove connecting part of the circulation member.

According to the invention of the above seventh example, it becomes possible to prevent occurrence of elevation change between the loaded rolling-element rolling groove of the nut and the rolling groove connecting part of the deflector even if there is variation in forming accuracy of the deflector hole.

According to the invention of the above eighth example, as the rolling groove connecting part of the circulation member is formed integral with the nut, it becomes possible to prevent occurrence of elevation change between the loaded rolling-element rolling groove of the nut and the rolling groove connecting part of the circulation member.

According to the invention of the above ninth example, as the scooping part is prevented from being misaligned relative to the nut, it becomes possible to scoop the rolling elements from the loaded rolling-element rolling path smoothly.

According to the invention of the above tenth example, it becomes possible to prevent occurrence of elevation change between the loaded rolling-element rolling groove of the nut and the rolling groove connecting part of the circulation member even if there is variation in forming accuracy of the through hole.

According to the invention of the above eleventh example, it is possible to use the nut inside die to form the end part of the circulation member jutting inside the die.

According to the invention of the above twelfth example, it is possible to use the pin shaped die to form the rolling-element return path of the end part of the circulation member.

According to the invention of the above thirteenth example, it is possible to use the cross-sectionally arc shaped die to form the scooping-part-side outer peripheral surface of the outer peripheral surface of the end part of the circulation member.

According to the invention of the above fourteenth example, it is possible to further prevent occurrence of elevation change between the loaded rolling-element rolling groove of the nut and the rolling groove connecting part of the circulation member.

According to the invention of the above fifteenth example, it becomes possible to eliminate space and elevation change at the joint between the loaded rolling-element rolling groove of the nut and the return groove of the deflector.

According to the invention of the above sixteenth example, as the deflector is formed using the inner die having the groove fitting convex part which conforms to the shape of the loaded rolling-element rolling groove of the nut and the return groove convex part which is continuous to the groove fitting convex part, it is possible to prevent occurrence of elevation change at the joint between the loaded rolling-element rolling groove of the nut and the return groove of the deflector.

According to the invention of the above seventeenth example, as the inner die having the return groove convex part for forming the return groove of the deflector can be aligned relative to the nut accurately, it is possible to form the return groove of the deflector at a predetermined position inside the deflector hole accurately.

According to the invention of the above eighteenth example, the deflector hole can be formed easier than a blind deflector hole formed in the inner peripheral side of the nut to form the deflector with use of the inner die only.

BRIEF DESCRIPTION OF REFERENCES

Figure 1:
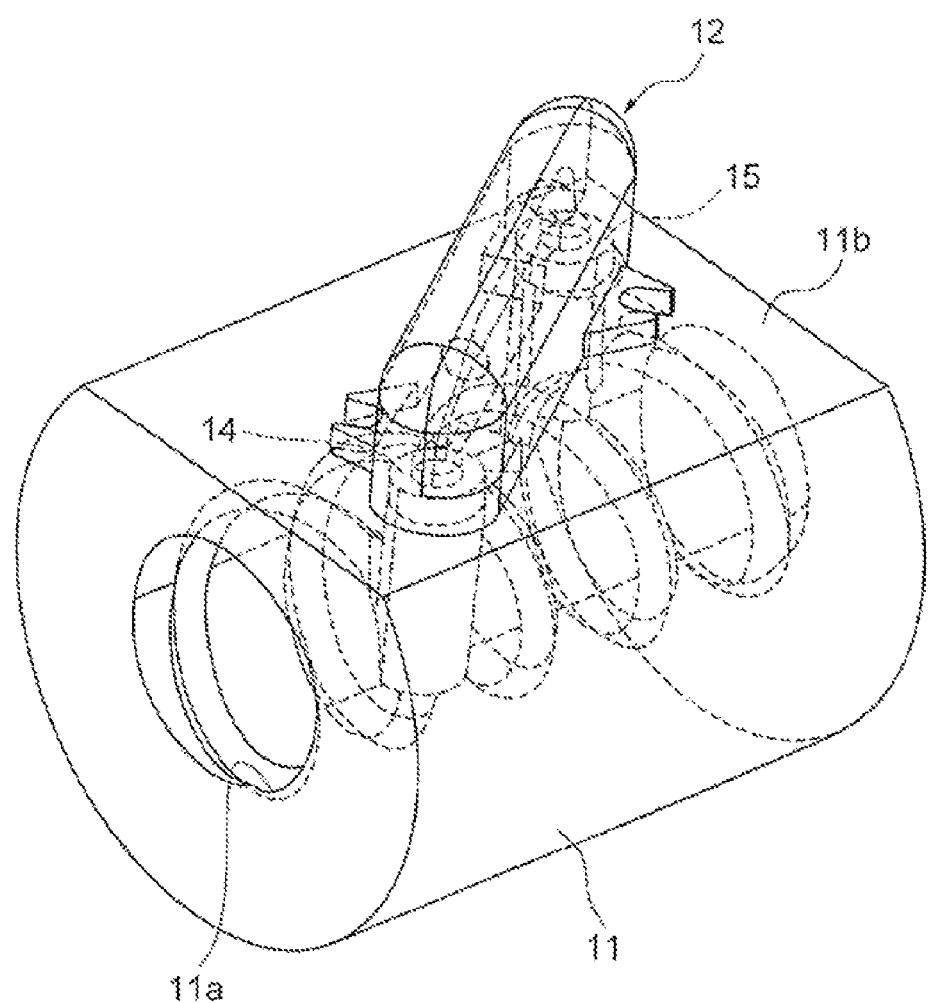
FIG. 1 is a perspective view of a nut of a screw device according to a first embodiment of the present invention.

1 ... screw shaft
1a ... ball rolling groove (rolling-element rolling groove)

3 . . . ball (rolling element)
8 . . . spacer
11 . . . nut
11a . . . loaded ball rolling groove (loaded rolling-element rolling groove)
12 . . . circulation member
13 . . . ball return path (rolling-element return path)
14, 15, 34, 35 . . . end part
17 . . . connecting part
18 . . . through hole
19 . . . connecting return path
22, 37 . . . rolling groove connecting part
23, 38 . . . scooping part
23a . . . boat bottom shaped scooping part
23b . . . spacer scooping part
27 . . . axis shaped die (nut inside die)
28 . . . thin plate shaped die (nut inside die)
29 . . . cross-sectionally arc shaped die
33 . . . pin shaped die
51 . . . nut
51a . . . loaded ball rolling groove (loaded rolling-element rolling groove)
53 . . . screw shaft
53a . . . ball rolling groove (rolling-element rolling groove)
54 . . . deflector
54a . . . return groove
55 . . . ball (rolling element)
58 . . . joint part
60 . . . outer die
64 . . . inner die
66 . . . groove fitting convex part
67 . . . hole fitting convex part
68 . . . return groove convex part

BEST MODES FOR CARRYING OUT THE INVENTION

Figure 2:
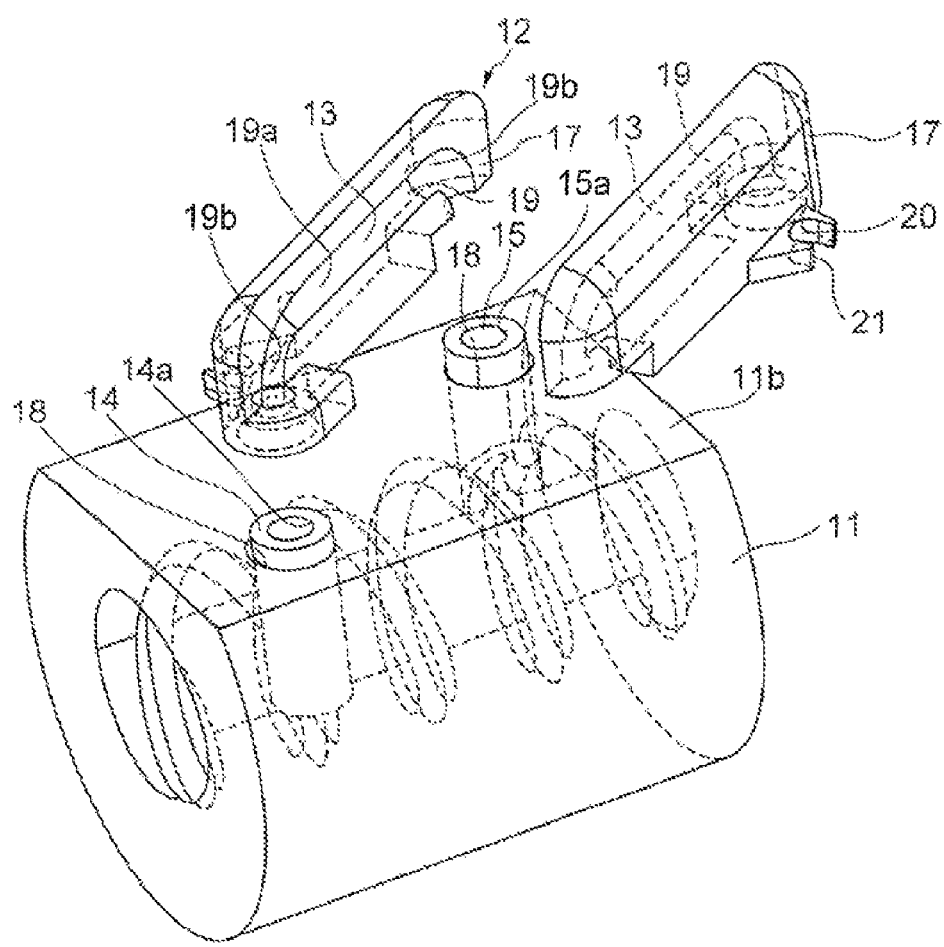
FIG. 2 is a perspective view of the nut of the screw device according to the first embodiment of the present invention (connecting part components are shown separated).
Figure 3:
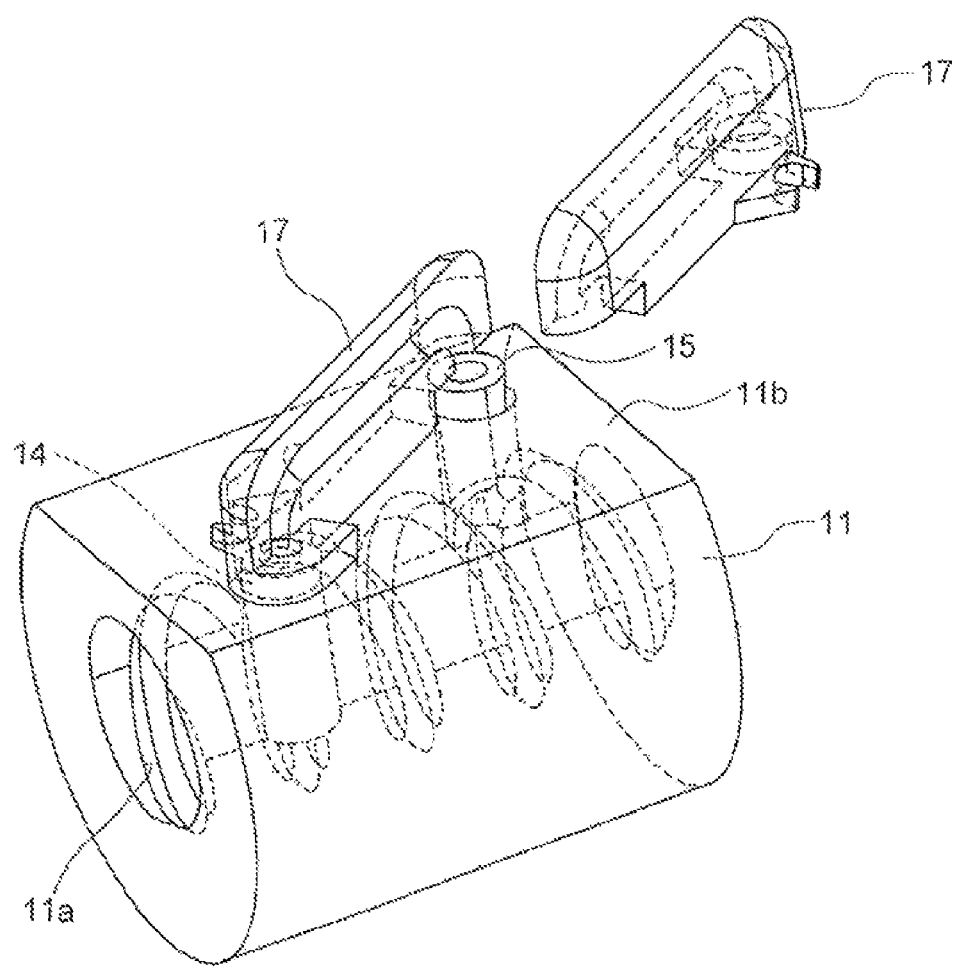
FIG. 3 is a perspective view of a nut of the screw device according to a first embodiment of the present invention (connecting part components are shown separated).

A. FIGS. 1 to 3 show a nut of a screw device according to a first embodiment of the present invention. FIG. 1 shows the nut 11 with a circulation member 12 mounted thereon, while FIGS. 2 and 3 show the nut 11 with the circulation member 12 disassembled. In an inner peripheral surface of the nut 11, there is formed a spiral loaded ball rolling groove as a loaded rolling-element rolling groove facing a rolling-element rolling groove of a screw shaft. Inside the nut 11, the screw shaft is inserted which has a spiral ball rolling groove as the rolling-element rolling groove formed on the outer peripheral surface thereof. Between the ball rolling groove of the screw shaft and the loaded ball rolling groove 11a of the nut 11, a plurality of balls is arranged and accommodated as rolling elements.

Figure 17:
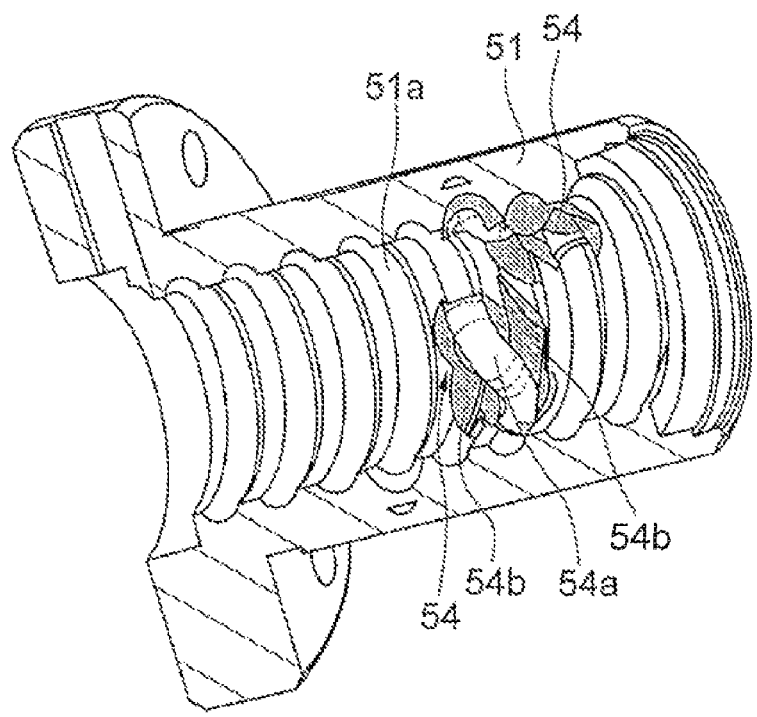
FIG. 17 is a cross sectional view of the nut in FIG. 16 (wing deflector).

As the structures of the screw shaft and a ball are the same as those of the conventional ball screw shown in FIG. 17, they are described with the same reference numerals as those assigned in FIG. 17. On the outer peripheral surface of the screw shaft 1, the ball rolling groove 1a is formed having a given lead. The ball rolling groove 1a is formed having a circular arc shaped cross section composed of a single arc or a Gothic arch shaped cross section composed of two arcs. As balls 3 roll on the ball rolling groove 1a of the screw shaft 1, the ball rolling groove 1a has its surface subjected to curing. The screw shaft 1 may be one-thread, two-thread or three-thread screw or the like. Between balls 3, a spacer 8 is arranged to prevent contact between the balls 3.

The screw shaft 1 is inserted into nut 11. As shown in FIG. 1, the spiral loaded ball rolling groove 11a is formed on the inner peripheral surface of the nut 11, facing the ball rolling groove 1a of the screw shaft 1. The cross section of the loaded ball rolling groove 11 is shaped like a circular arc composed of a single arc or a Gothic arch composed of two arcs. As the balls 3 roll on the loaded ball rolling groove 11a, the loaded ball rolling groove 11a has its surface subjected to curing. The nut 11 has a side surface on which a flat surface part 11b is formed.

On the flat surface part 11b of the nut 11, a circulation member 12 is provided for circulating the balls 3 rolling on a loaded ball rolling path between the ball rolling groove 1a of the screw shaft 1 and the loaded ball rolling groove 11a of the nut 11. The circulation member 12 has a ball return path 13 formed therein as a rolling-element return path connecting one end of the loaded ball rolling groove 11a of the nut 11 to the other (see FIG. 2). These loaded ball rolling path and ball return path 13 form a ball circulation path where the plural balls 3 are arranged.

When the screw shaft 1 is rotated relative to the nut 11, the balls 3 roll between the loaded ball rolling groove 11a of the nut 11 and the ball rolling groove 1a of the screw shaft 1. Once rolling up to an end of the loaded ball rolling path, each ball 3 is scooped up from the loaded ball rolling path into the ball return path 13 by an end part 14 of the circulation member 12. The inner diameter of the ball return path 13 is slightly larger than the diameter of each ball 3. On the ball return path 13, a ball 3 moves pushed by its following ball 3. After moving on the ball return path 13, the ball 3 is returned, via the other end part 15 of the circulation member, several-thread back to the other end of the loaded ball rolling path. All the while the screw shaft 1 is rotated relative to the nut 11, the balls 3 endlessly circulate on the ball circulation path including the loaded ball rolling path and the ball return path 13.

As shown in FIG. 2, the circulation member 12 has a pair of end parts 14 and 15 and a connecting part 17 jutting from the flat surface part 11b and connecting the paired end parts 14 and 15. Inside the paired end parts 14 and 15, respective ball return paths 14a and 15a extend straightly. These ball return paths 14a and 15a are arranged in the tangential direction of the loaded ball rolling path. In the flat surface part 11b, there are formed through holes 18 reaching the loaded ball rolling groove 11a of the nut 11. The end parts 14 and 15 of the circulation member 12 are made of resin and formed integral with the inner peripheral surfaces of these through holes 18.

The connecting part 17 is a resin-molded component. The connecting part 17 has a U-shaped connecting return path 19 formed connecting the ball return paths 14a and 15a of the paired end parts 14 and 15. The connecting return path 19 has a center return path 19a straightly extending from one end part 14 of the circulation member 12 toward the other end part 15 and end return paths 19b provided at the respective ends of the center return path 19a and bent into arc. The connecting part 17 is split into two along the center line of the ball return path 13 and each split component has a jutting part 20 formed integrally. The jutting part 20 has a retaining screw insertion part 21 in which a retaining screw is inserted for fastening the connecting part 17 to the side surface of the nut 11.

Figure 4:
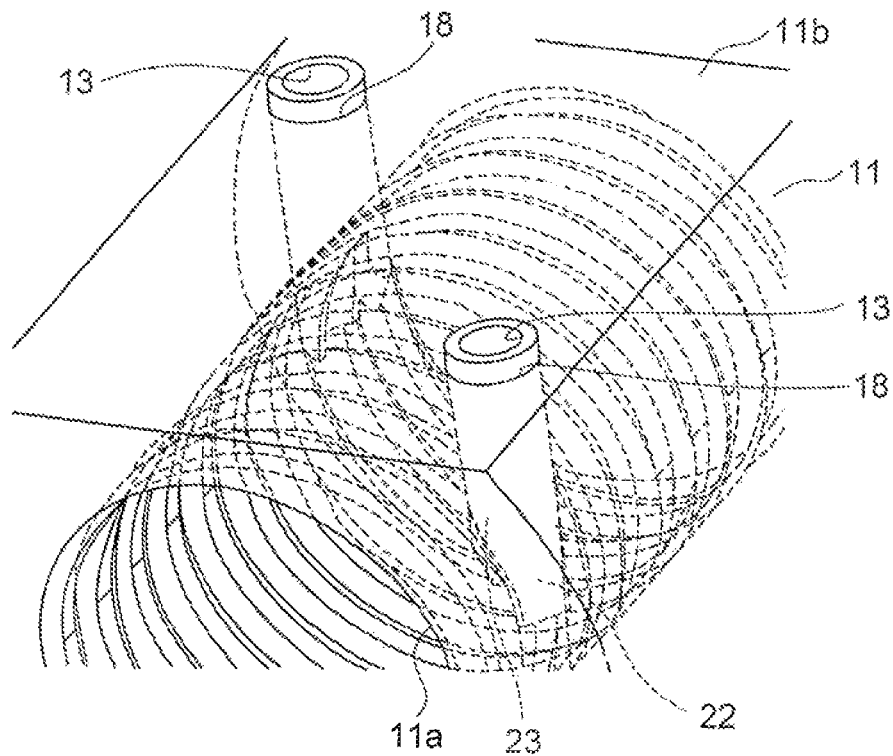
FIG. 4 is a perspective view of an end part of the circulation member.
Figure 6:
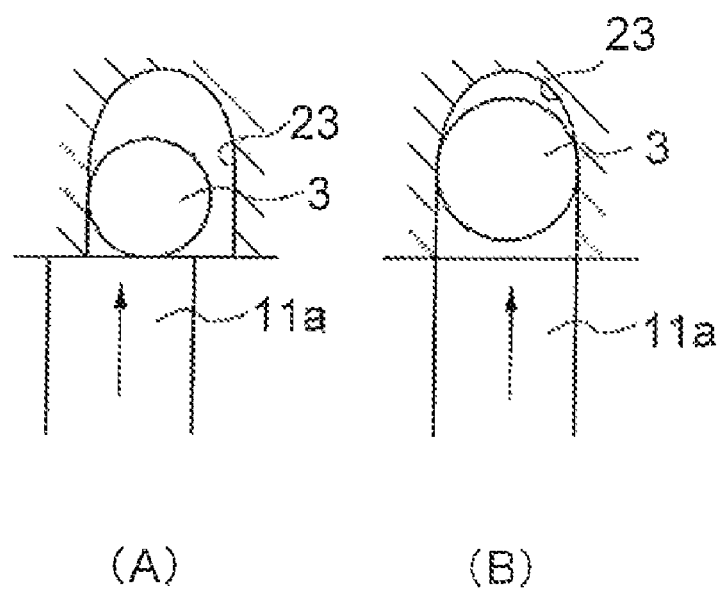
FIGS. 6(A) and 6(B) are views each showing a positional relation between the loaded ball rolling groove of the nut and the scooping part (FIG. 6(A) showing they are displaced from each other and FIG. 6(B) showing they match each other).

FIG. 4 shows the end parts 14 and 15 of the circulation member 12. The paired end parts 14 and 15 are formed integral with the paired through holes 18 of the nut 11, respectively. The two end parts 14 and 15 are arranged and directed differently, but they have the same structures. The periphery of each of the end parts 14 and 15 includes a rolling groove connecting part 22 which is positioned to the loaded ball rolling groove 11a side of the nut 11 relative to the center line of the ball return path 13 in the end parts 14 and 15, and is linked to the loaded ball rolling groove 11a, and a scooping part 23 which is positioned to the ball rolling groove side of the screw shaft 1 relative to the center line of the ball return path 13 in the end parts 14 and 15 and scoops each ball from the loaded ball rolling path. In order to eliminate the elevation change at the joint between each of the end parts 14 and 15 and the loaded ball rolling groove 11a of the nut 11, at least the rolling groove connecting part 22 of each of the end parts 14 and 15 is required to be formed integral with the nut 11. In this embodiment, as the scooping part is also formed integral with the rolling groove connecting part 22, not only the rolling groove connecting part 22 but also the scooping part 23 is formed integral with the nut 11. When the scooping part is integral with the nut, as shown in FIG. 6(B), the scooping part 23 is prevented from being displaced from the loaded ball rolling groove 11a of the nut 11. Hence, balls 3 are scooped up smoothly. FIG. 6(A) shows an comparative example in which the scooping part 23 and the loaded ball rolling groove 11a are misaligned. When they are misaligned (displaced from each other), balls 3 may bump unevenly into the scooping part 23 and therefore, smooth scooping of the balls 3 is prevented.

Figure 5:
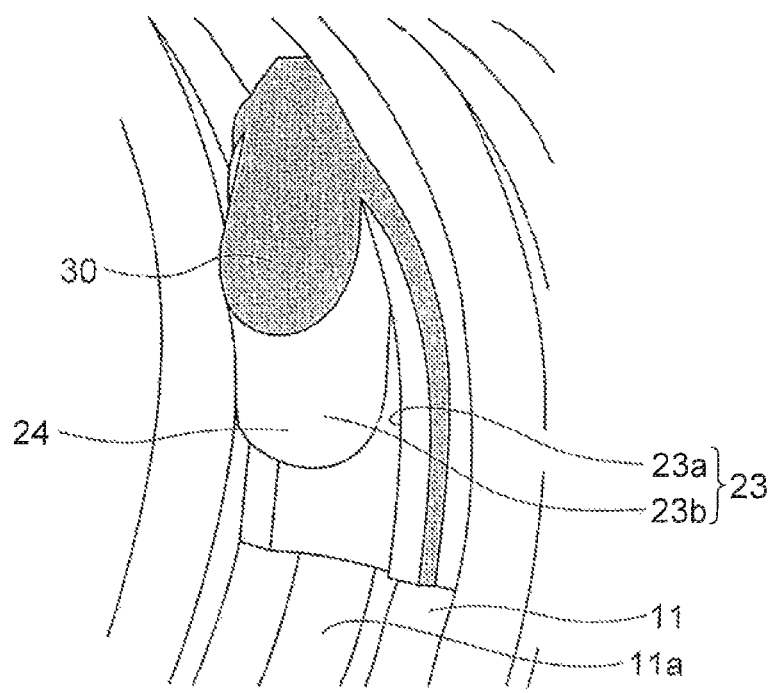
FIG. 5 is a perspective view of a scooping part exposed inside the nut.

As shown in FIG. 5, each of the end parts 14 and 15 has the scooping part 23 jutting to the inside of the nut 11. The scooping part 23 has a boat bottom shaped scooping part 23a having a groove of which a width becomes narrower upward and toward the end parts 14, 15 and a lip-shaped spacer scooping part 23b which is in contact with each spacer 8 positioned between balls 3 to scoop the balls 3. The boat bottom shaped scooping part 23a holds each ball 3 rolling on the loaded ball rolling path to guide the ball 3 toward the inside of the end parts 14, 15. The spacer scooping part 23b comes into contact with the spacer 8 moving on the loaded ball rolling path and guides the spacer 8 to the inside of the end parts 14, 15. Here, in a full ball type ball screw having no spacer between the balls 3, the spacer scooping part 23b is omitted. Further, the boat bottom shaped scooping part 23a may be replaced with a lip-shaped ball scooping part which is in contact with each ball 3 to scoop up the ball 3 from the loaded ball rolling path.

Figure 7:
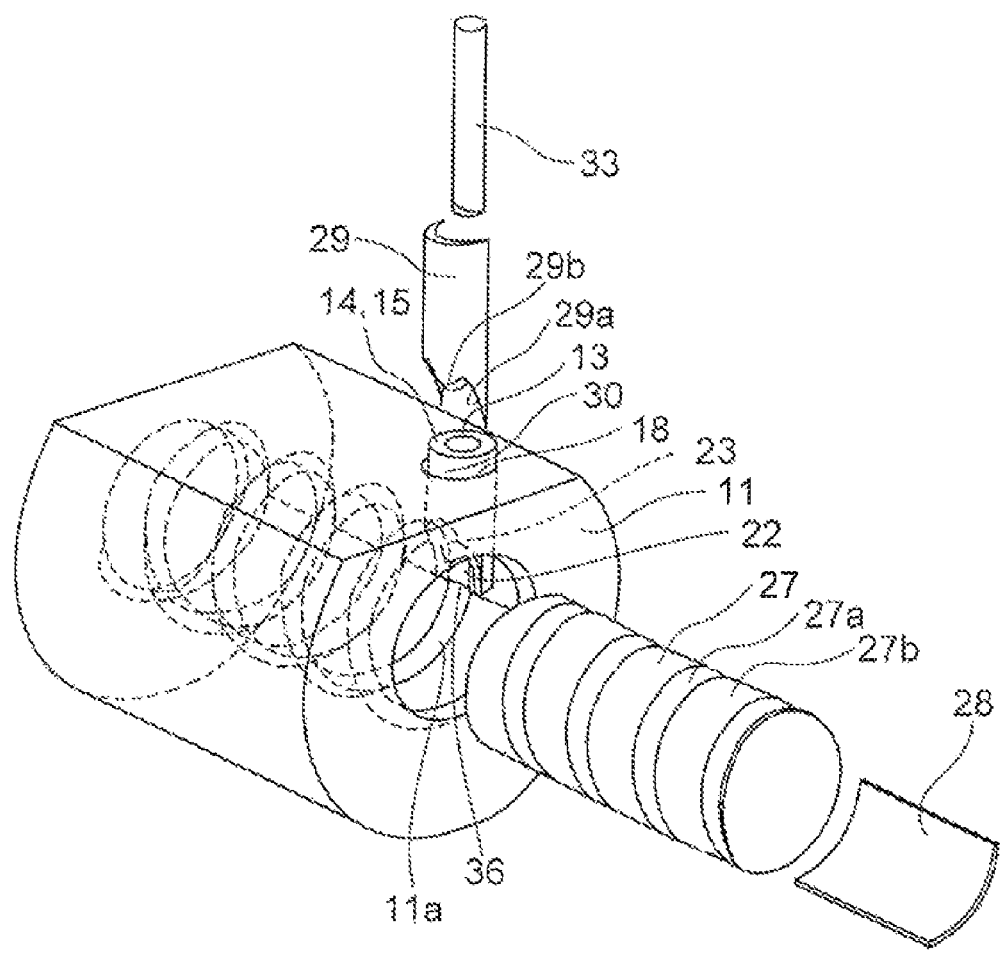
FIG. 7 is a perspective view of the nut and dies.

FIG. 7 shows dies for molding of the end parts 14 and 15. In order to form the scooping part 23, it is necessary to use the die to block the scooping part 23b jutting inside the nut 11 with the die. In order to form the screw-shaft-1 side end surface 24 of the spacer scooping part 23b and the groove of the boat bottom shaped scooping part 23a shown in FIG. 5, an axis shaped die 27 is arranged inside the nut. The axis shaped die 27 has a larger diameter than that of the screw shaft 1. In the axis shaped die 27, a spiral groove 27a is formed on the outer peripheral surface thereof like the screw shaft 1. The groove 27a is used to form the end surface 24 of the spacer scooping part 23b. Then, the outer peripheral surface 27b of the axis shaped die 27 is used to form the groove shape of the boat bottom shaped scooping part 23a. As after molding, the spacer scooping part 23b juts in the groove 27a of the axis shaped die 27, the axis shaped die 27 should be removed from the nut 11 while rotating. In case of continuous working, in order that the boat bottom shaped scooping part 23a and the spacer scooping part 23b can be molded at the fixed position of the nut 11, the axis shaped die 27, which is drawn from the nut 11, needs to be returned into an axially fixed position of the nut 11. Here, if the axis shaped die 27 is drawn from the nut 11 rotatingly, attention should be given to the phase of the groove 27a of the axis shaped die 27 for forming the boat bottom shaped scooping part 23a and the spacer scooping part 23b, for example, by rotating the axis shaped die 27 backward through the same rotation angle. However, for the full ball type ball screw having no spacer 8 between balls 3, the spacer scooping part 23b is not provided on the scooping part 23 and only the boat bottom shaped scooping part 23a is provided. In this case, as there is no spacer scooping part jutting inside the groove 27a of the axis shaped die 27, the axis shaped die can be drawn from the nut without being rotated.

A thin plate shaped die 28 bent into a cylinder is provided to shape the edges of the end parts 14 and 15. As shown in FIG. 5, the boat bottom shaped scooping part 23a slightly juts from the nut 11. The thin plate shaped die 28 is slidingly inserted into a gap formed between the axis shaped die 27 and the nut 11 to fill in a gap of the jutting part at the lower end of the boat bottom shaped scooping part 23a. These thin plate shaped die 28 and axis shaped die 27 are arranged inside the nut 11 to shape the end parts 14 and 15 jutting to the inside of nut 11. Therefore, these thin plate shaped die 28 and axis shaped die 27 are called nut inside dies.

A cross-sectionally arc shaped die 29 is inserted into each of the through holes 18 formed in the side surface of the nut 11. Then, of the outer peripheral surface of each of the end parts 14 and 15, a scooping-part-23 side outer peripheral surface 30 is formed (see FIG. 5). This outer peripheral surface 30 extends inside the thread bottom of the loaded ball rolling groove 11a of the nut 11. Even if the die is axially split into two and inserted into the nut 11 from the respective end sides of the nut 11, the outer peripheral surface 30 positioned in the thread bottom of the loaded ball rolling groove 11a of the nut cannot be formed. Hence, the cross-sectionally arc shaped die 29 is required to be inserted into the through hole 18. At the bottom of the cross-sectionally arc shaped die 29, a notch 29a is formed conforming to the shape of the outer peripheral surface 27b of the axis shaped die 27, and a lip part 29b is formed to fit inside the groove 27a of the axis shaped die 27. After molding of the end parts 14 and 15, the cross-sectionally arc shaped die 29 is separated from the nut 11. Then, between the inner peripheral surface of the through hole 18 and the scooping-part-23 side outer peripheral surface 30 of each of the end parts 14 and 15, there is formed a space into which the cross-sectionally arc shaped die 29 can be inserted. If adhesion of the molded end parts 14 and 15 to the nut 11 is not sufficiently strong, any material of the same shape as this space may be positioned in the space.

A pin shaped die 33 is inserted into the through hole 18 formed on the side surface of the nut 11 to shape the ball return path 13 of each of the end parts 14 and 15. A lower end of the pin shaped die 33 fits into the groove 27a of the axis shaped die 27. The lower end of the pin shaped die 33 is chamfered conforming to the shape of the groove 27a of the axis shaped die 27 and conforming to the chamfered part of the loaded ball rolling groove 11a of the nut 11. Accordingly, the lower end of the pin shaped die 33 is precisely positioned relative to the loaded ball rolling groove 11a of the nut 11 and the axis shaped die 27. The lower end of the pin shaped die 33 is used to form the rolling groove connecting part 22 of the end parts 14 and 15. As the lower end of the pin shaped die 33 is positioned, the rolling groove connecting part 22 can be accurately formed and there is no elevation change formed at the joint 36 between the loaded ball rolling groove 11a of the nut 11 and the rolling groove connecting part 22.

Figure 8:
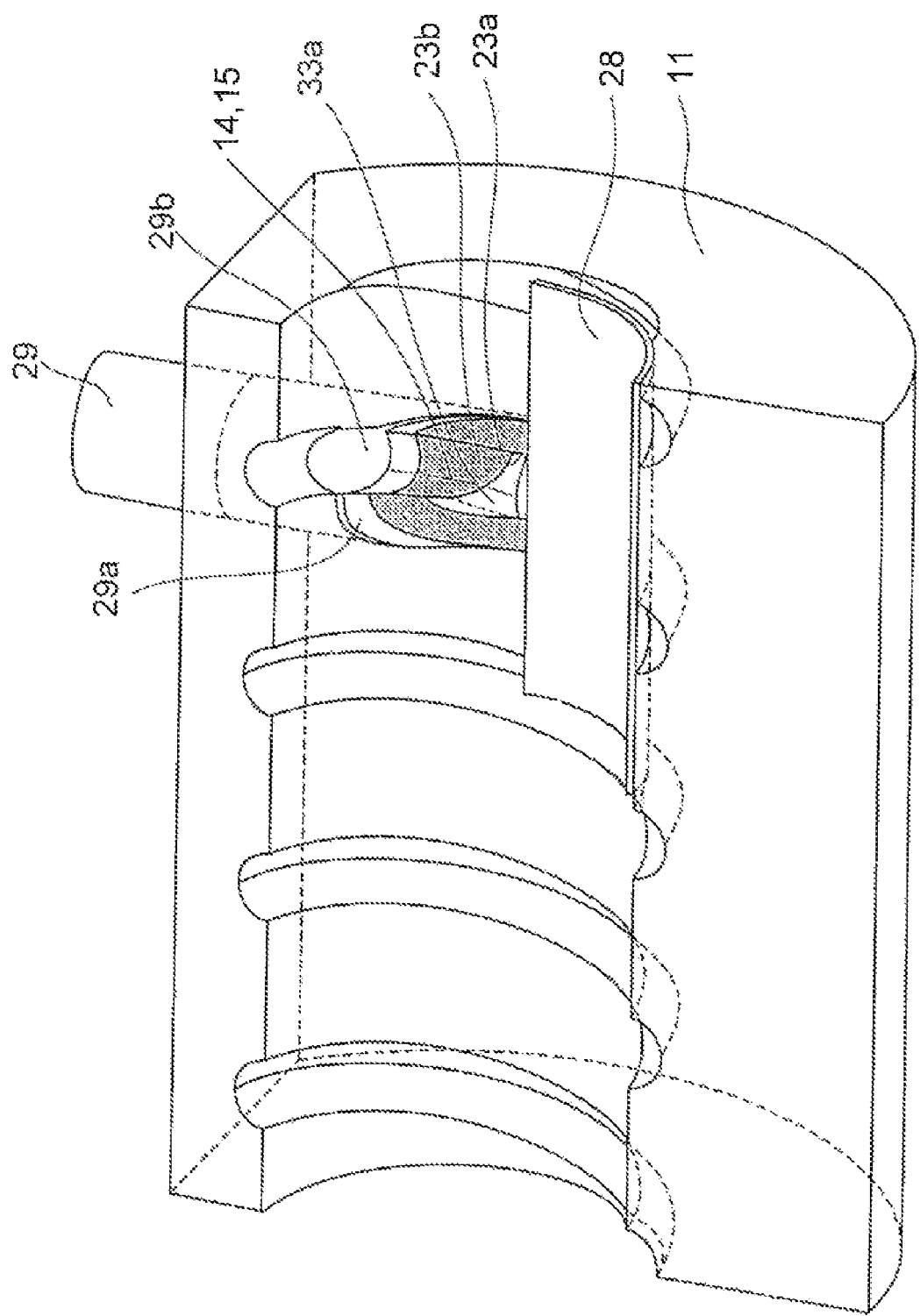
FIG. 8 is a view showing the dies from which an axis shaped die is removed.
Figure 9:
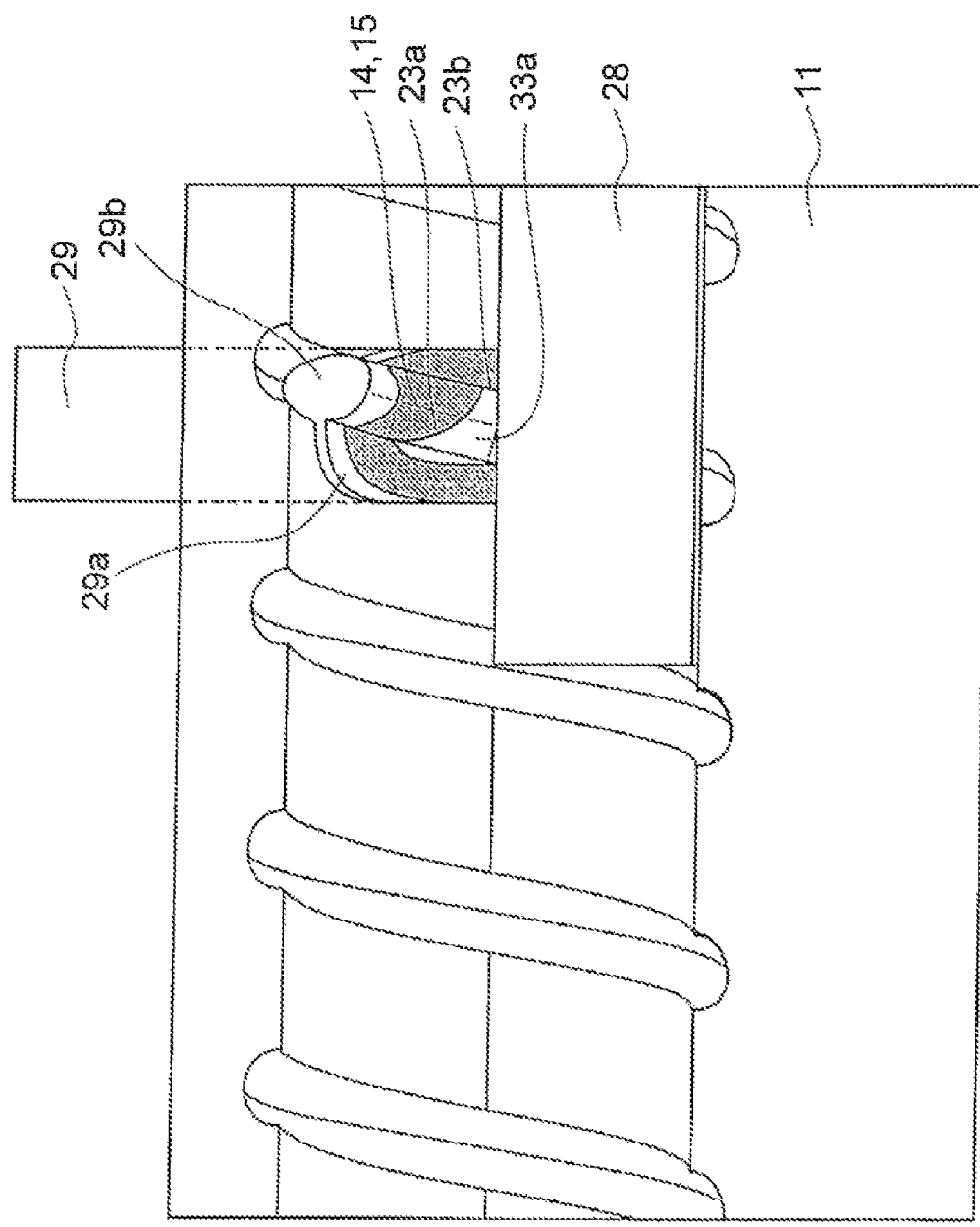
FIG. 9 is a view showing the dies from which the axis shaped die is removed.

FIGS. 8 and 9 show the dies seen from the inside of the nut 11, from which the axis shaped die 27 is removed. The edge 33a of the pin shaped die 33 and the lip part 29b of the cross-sectionally arc shaped die 29 are fit in the groove 27a of the axis shaped die 27. The groove 27a of the axis shaped die 27 is inclined in accordance with the lead of the screw shaft 1. The notch 29a of the cross-sectionally arc shaped die 29 is in contact with the outer peripheral surface 27b of the axis shaped die 27. The boat bottom shaped scooping part 23a of each of the end parts 14 and 15 is formed by the outer peripheral surface 27b of the axis shaped die 27, while the spacer scooping part 23b is formed by the groove 27a of the axis shaped die 27. The thin plate shaped die 28 is provided to fill the elevation change at the lower end of each of the end parts 14 and 15. These cross-sectionally arc shaped die 29, pin shaped die 33, axis shaped die 27 and thin plate shaped die 28 are used to form a cavity, which forms each of the end parts 14 and 15 of the circulation member 12.

Figure 10:
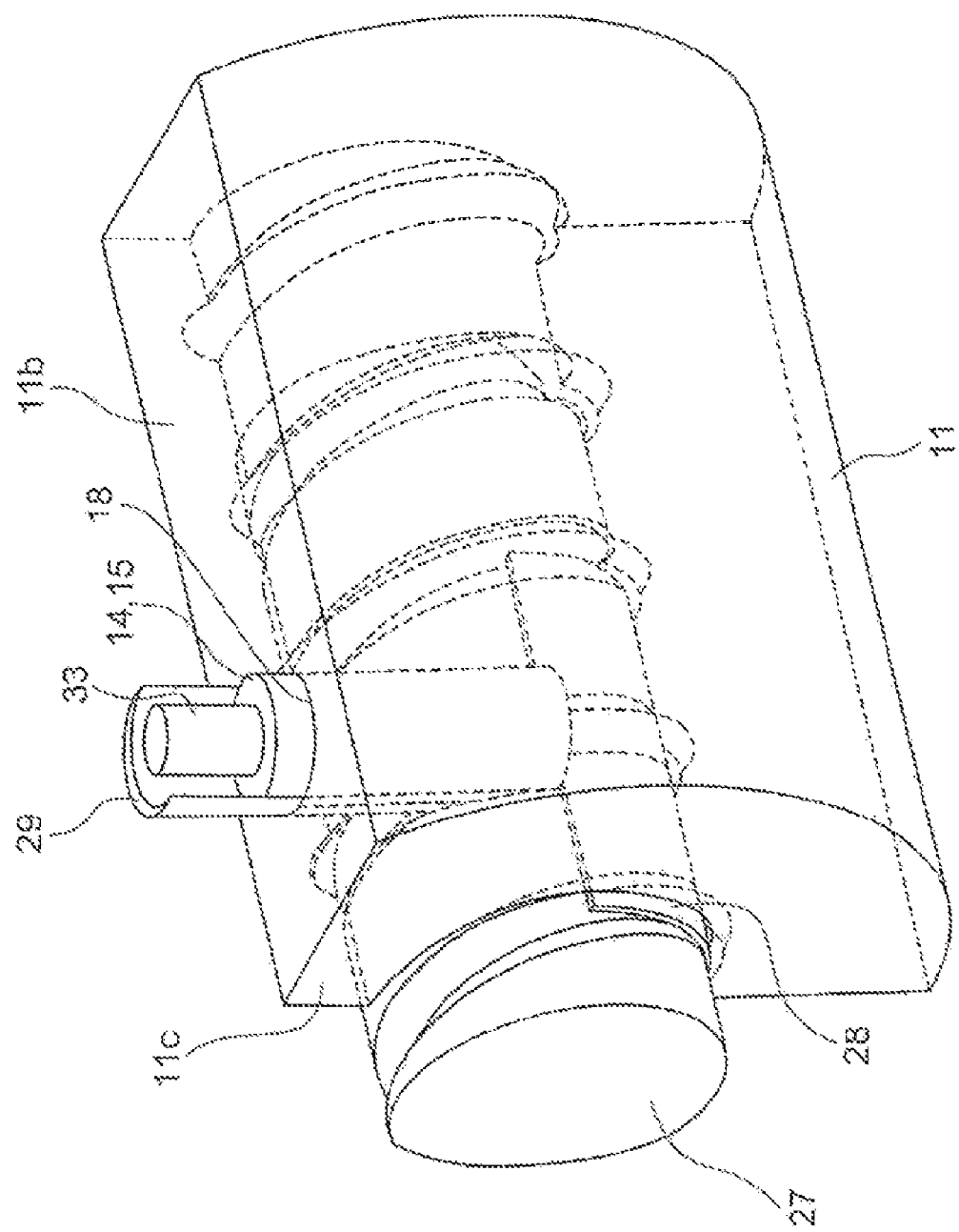
FIG. 10 is a view showing a die assembly.
Figure 11:
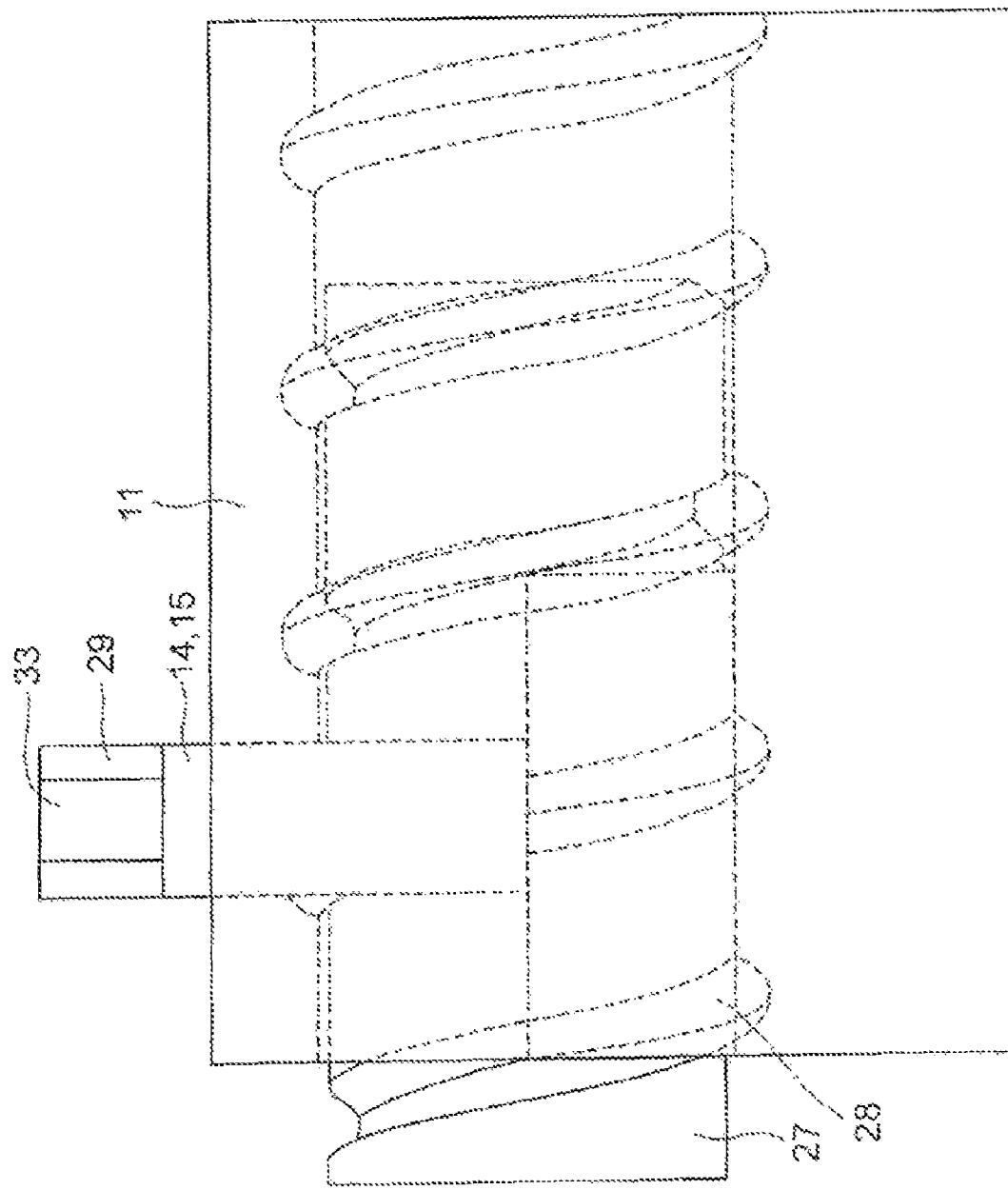
FIG. 11 is a view showing a die assembly.

FIGS. 10 and 11 show assembly of all the dies. The axis shaped die 27 and the thin plate shaped die 28 are set inside the nut 11, and the cross-sectionally arc shaped die 29 and the pin shaped die 33 are inserted into the through hole 18, and then the cavity of each of the end parts 14 and 15 is formed. As injection-molding of resin is performed inside the cavity, the end parts 14 and 15 are formed integral with the through hole.

The upper end surface of each of the end parts 14 and 15 jutting from the through hole 18 is also blocked with the die. When the nut 11 becomes thinner at the flat surface part 11b, the nut 11 may be deformed with resin injected from the upper end surface of each of the end parts 14 and 15. For this reason, an insertion hole may be formed in an axial end surface 11c of the nut 11 for injecting resin toward the end parts 14 and 15.

Figure 12:
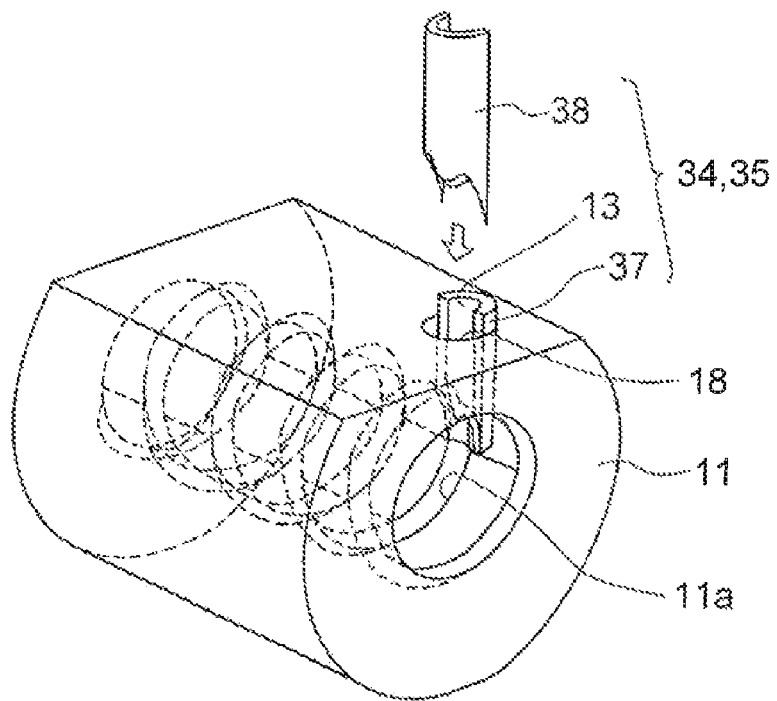
FIG. 12 is a perspective view of a nut of a screw device according to a second embodiment of the present invention.

FIG. 12 shows a nut of a screw device according to a second embodiment of the present invention. In this embodiment, only a rolling groove connecting part 37 of the periphery of each of end parts 34 and 35 of the circulation member is formed integral with the through hole 18 of the nut 11. The other scooping part 38 is resin-molded separately from the rolling groove connecting part 37 and fit into the through hole 18. Only the rolling groove connecting part 37 of each of the end parts 34 and 35 is linked to the loaded ball rolling groove 11a of the nut 11. Hence, if at least the rolling groove connecting part 37 of each of the end parts 34, 35 is formed integral with the nut 11, there is no elevation change formed at the joint of the ball return path 13 and the loaded ball rolling groove 11a. In this embodiment, as the end parts 34 and 35 have the shape of half split, the die structure is simpler.

Figure 13:
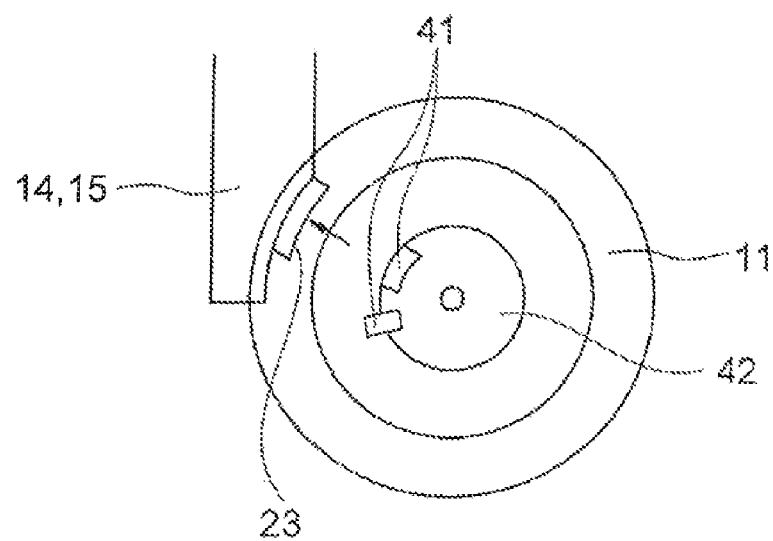
FIG. 13 is a cross sectional view of another example of the die.

FIG. 13 shows another example of the die. As described above, if the scooping part 23 jutting inside the nut 11 shown in FIG. 5 is blocked, the end parts 14 and 15 are formed integral with the nut. In view of this, in this embodiment, a die 42 of small diameter provided with a movable part 41 is inserted into the nut 11. Once the die 42 is moved to a predetermined position of the nut 11, the movable part 41 is made to jut from the nut surface and block the scooping part 23 of the end parts 14 and 15. The movable part 41 has a shape conforming to the scooping part 23 jutting inside the nut 11. This example has an advantage of eliminating a need to use the die repeatedly.

Figure 14:
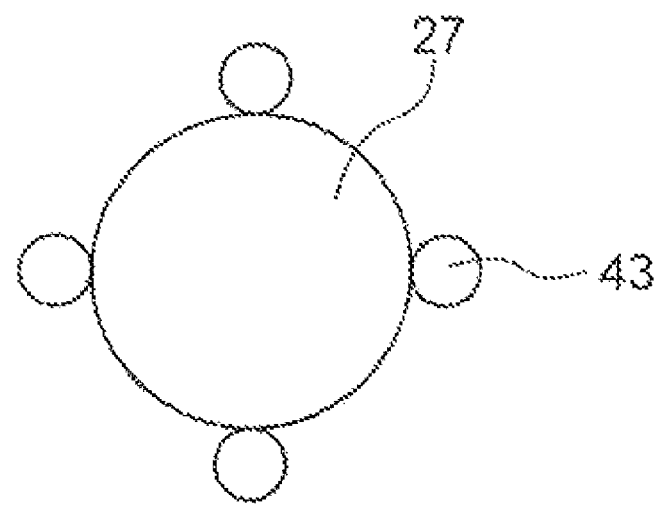
FIG. 14 is a view showing another example of the axis shaped die.
Figure 15:
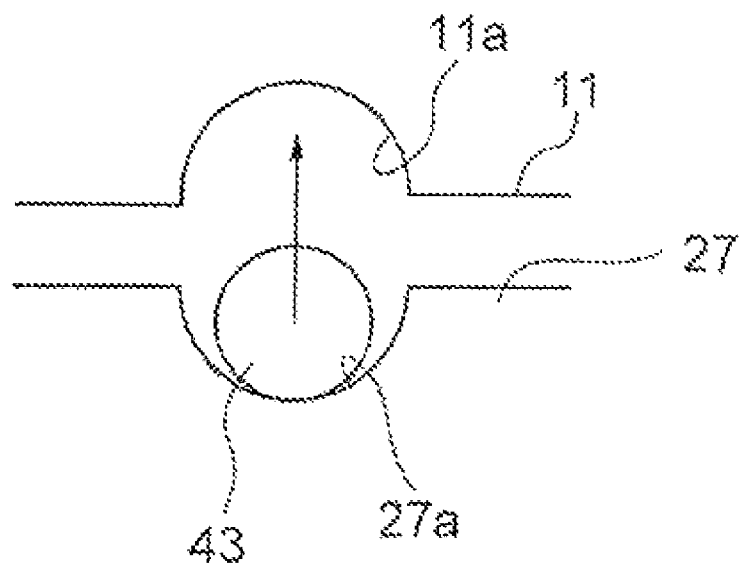
FIG. 15 is a view showing the operation of a ball fit in the groove of the axis shaped die.

FIG. 14 shows another example of the axis shaped die. In this example, the axis shaped die 27 is provided with a ball 43 that can jut in the groove of the outer peripheral surface of the axis shaped die 27. Such a ball 43 is provided circumferentially at four parts of the axis shaped die 27, for example. In order that the end parts 14 and 15 of the circulation member can be formed at their right positions, it is necessary to position the groove 27a of the axis shaped die 27 and the loaded ball rolling groove 11a of the nut 11 precisely. As shown in FIG. 15, when the ball 43 is made to jut from the groove 27a of the axis shaped die 27 to fit to the loaded ball rolling groove 11a of the nut 11, the groove 27a of the axis shaped die 27 and the loaded ball rolling groove 11a of the nut 11 are positioned precisely. Accordingly, the end parts 14 and 15 of the circulation member 12 can be formed at the right positions of the nut 11. When the axis shaped die 27 is drawn from the nut 11, the balls 43 sit back.

Here, if the rolling groove connecting part 22 is cut or grinded simultaneously with chamfering of the loaded ball rolling groove 11a after the end parts 14 and 15 are formed integral with the nut 11, there is surely no elevation change formed. Accordingly, after the end parts 14 and 15 of the circulation member 12 are formed integral with the nut 11, the rolling groove connecting part 22 may be cut or grinded with the loaded ball rolling groove 11a. Further, after the end parts 14 and 15 are molded into columns, the ball return path 13 is formed by cutting with a drill, and then, the scooping part 23 can be cut or grinded at the edges of the end parts 14 and 15.

Here, the present invention is not limited to the above-described embodiment and may be embodied in various formed without departing from the scope of the present invention. For example, in the above-described embodiment, like a return pipe type screw device, the through holes are formed in the side surface of the nut and the end parts of the circulation member are formed inside the through holes. However, the present invention is applicable to an endcap type screw device. That is, a notch is formed in an axially end surface of the nut and an end part of the circulation member is formed integrally with the notch. As rolling elements, rollers may be used instead of balls. Further, the resin molding may be replaced with MIM (Metal Injection Molding) which is injection molding of a mixture of binder and metal powder particles with use of a die.

Figure 16:
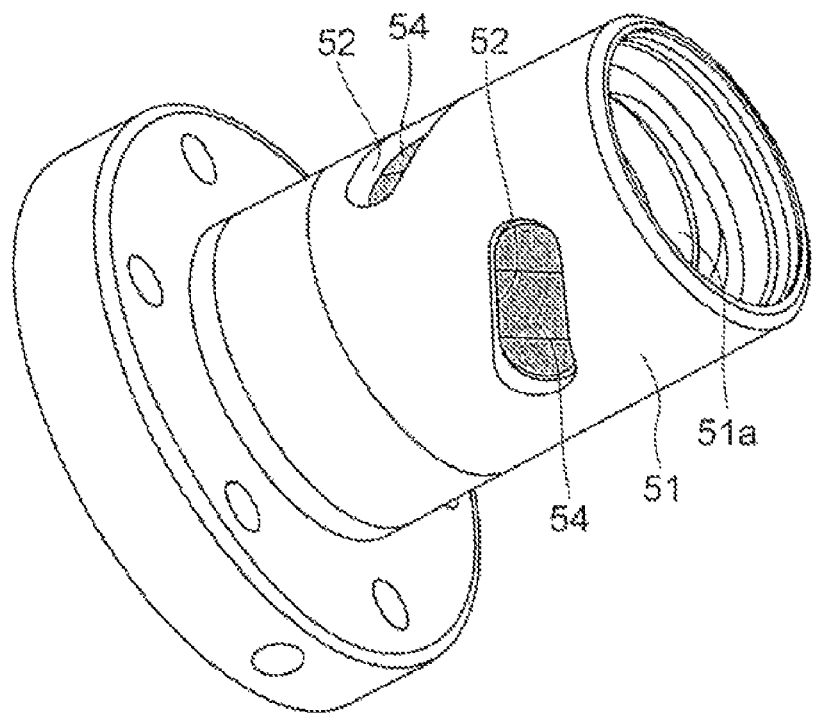
FIG. 16 is a perspective view of a nut of a screw device according to a third embodiment of the present invention.

B. FIGS. 16 and 17 show a nut 51 of a screw device according to a third embodiment of the present invention. FIG. 16 is a perspective view of the nut 51, and FIG. 17 is a cross sectional view. The nut 51 has an inner peripheral surface on which a spiral loaded ball rolling groove 51a is formed. The cross section of the loaded ball rolling groove 51a has a shape of a circular arc groove composed of a single arc or a Gothic arch groove composed of two arcs. As the balls roll on the loaded ball rolling groove 51a, the surface of the loaded ball rolling groove 51a is subjected to curing.

At a circumferential part of the nut 51, there is formed a deflector hole 52 penetrating from the inner peripheral surface of the nut 51 to the outer peripheral surface. The deflector hole 52 is formed integral with a resin-made deflector 54. At the bottom surface of the deflector 54, an almost S-shaped return groove 54a is formed connecting both ends of the loaded ball rolling groove 51a of less than one turn of the nut 51. The return groove 54a changes the moving direction of each ball rolling in the loaded ball rolling groove 51a of the nut 51, brings the ball 55 over a screw thread of the screw shaft and returns the ball one thread back to the loaded ball rolling groove 51a. The return groove 54a has a longitudinally center part which is most recessed so that each ball rolling in the return groove 54a can get over the screw thread of the screw shaft.

Figure 18:
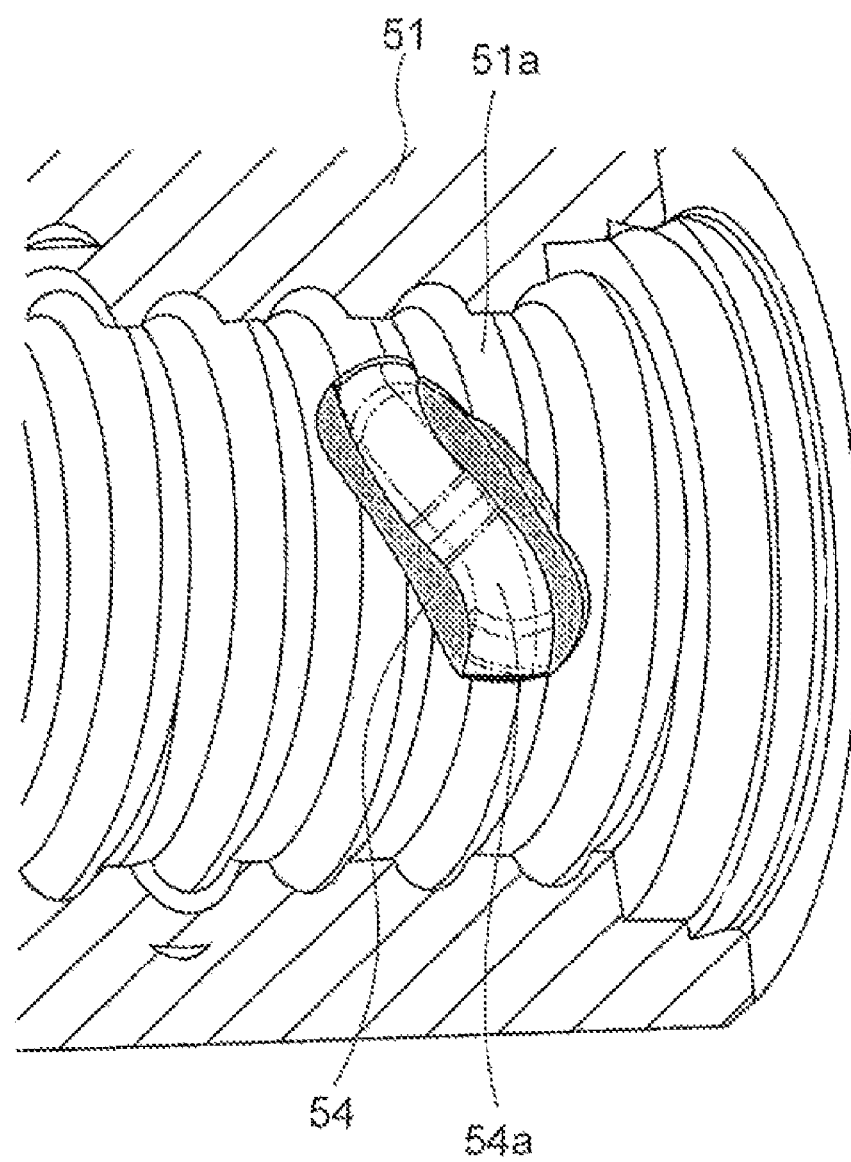
FIG. 18 is a cross sectional view of the nut in FIG. 16 (typical deflector).

The deflector 54 may be provided with a wing part 54b which is fit in the loaded ball rolling groove 51a of the nut 51 as shown in FIG. 17, or such a wing part may not be formed as shown in FIG. 18. Each ball moving in the lead angle direction of the screw shaft changes its direction when it is in touch with the wing part 54b. As the wing part 54b is formed in the deflector 54, the deflector 54 can be reinforced.

Figure 19:
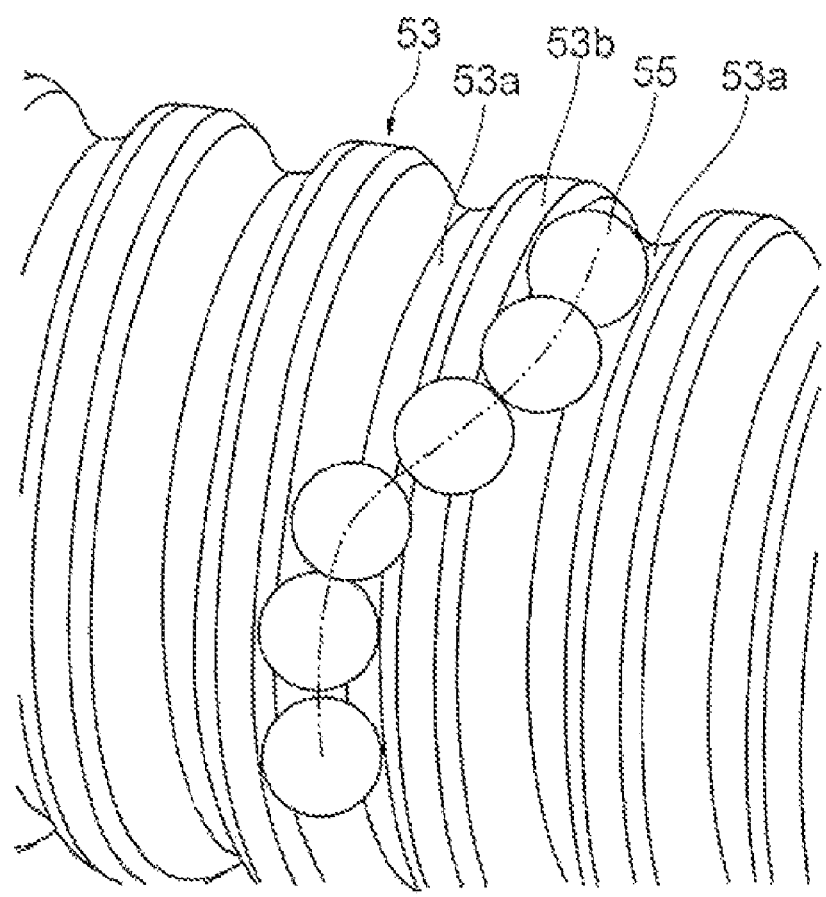
FIG. 19 is a view showing balls moving on the screw shaft (perspective view of the screw shaft).
Figure 20:
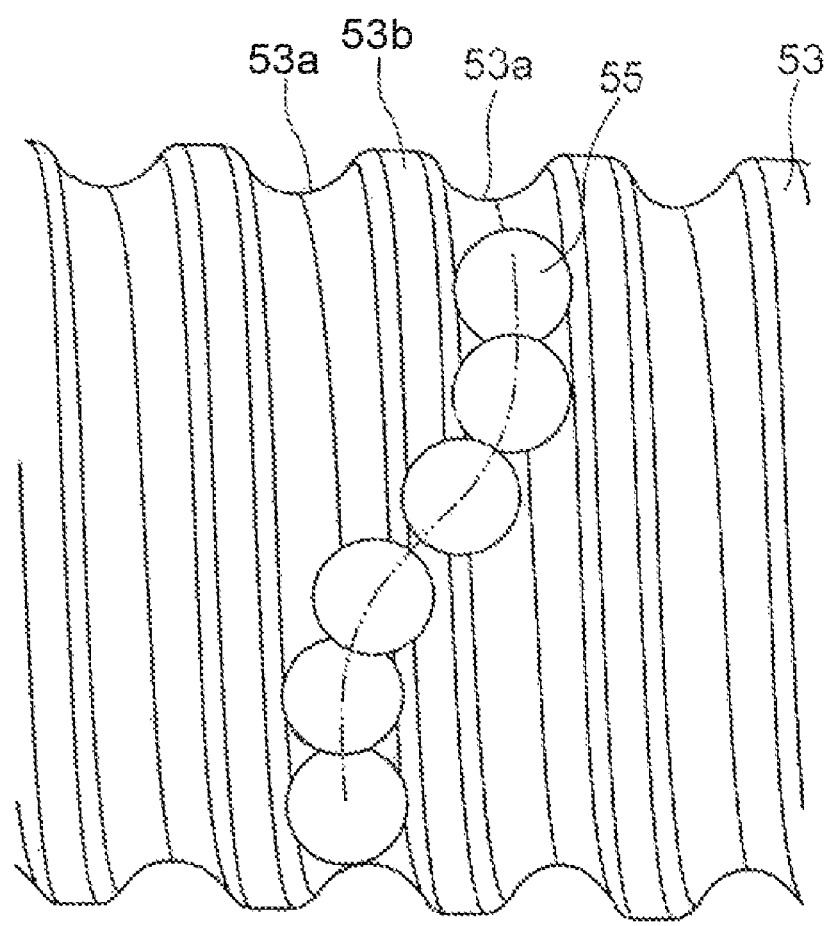
FIG. 20 is a view showing balls moving on the screw shaft (plane view of the screw shaft).
Figure 21:
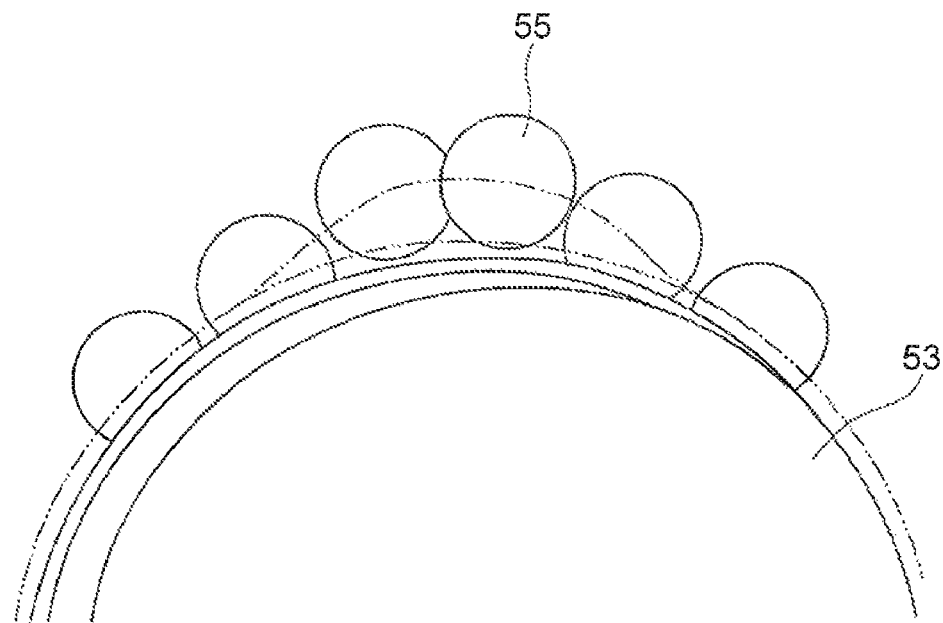
FIG. 21 is a view showing balls moving on the screw shaft (front view of the screw shaft).

FIGS. 19 to 21 show balls 55 moving on the screw shaft 53. FIG. 19 is a perspective view of the screw shaft 53, FIG. 20 is a plane view of the screw shaft 53 and FIG. 21 is a view of the screw shaft 53 seen axially. On the outer peripheral surface of the screw shaft 53, a spiral ball rolling groove 53a is formed having a given lead. The ball rolling groove 53a has a shape of a circular arc groove composed of a single arc or a Gothic arch groove composed of two arcs. As the balls 55 move on the ball rolling groove 53a, the surface of the ball rolling groove 53a is subjected to curing. The screw shaft 53 may be one-thread, two-thread, three-thread screw shaft or the like. Between balls 55, a spacer is provided to prevent contact between the balls 55.

As described above, each ball 55 rolling on the ball rolling groove 53a of the screw shaft 53 in the lead angle direction is made to change its direction toward the screw thread 53b by the return groove 54a of the deflector 54 and goes over the screw thread 53b. After getting over the screw thread 53b, the ball 55 is returned one thread back to the ball rolling groove 53a. As the ball 55 moves in contact with the screw thread 53b, the raceway of the ball 55 in the return groove 54a has a shape conforming to the shape of the screw thread 53b. As the top of the screw thread 53b are chamfered the raceway of the ball 55 becomes smooth. The return groove 54a of the deflector 54 is recessed at an outermost position of the raceway of the ball 55 rolling over the screw thread 53b.

Between the loaded ball rolling groove 51a of less than one turn of the nut 51 and the ball rolling groove 53a of the screw shaft 53, a loaded ball rolling path of less than one turn is formed. Between the return groove 54a of the deflector 54 and the screw shaft 53, an unloaded return path is formed. These loaded ball rolling path and unloaded return path are used to form a one-turn ball circulation path. A plurality of deflectors 54 is provided circumferentially on the nut 51, and one-turn ball circulation paths are provided equal in number to the deflectors 54. When the nut 51 is moved to one axial end of the screw shaft 53, balls 55 can be arranged in the ball circulation path.

Figure 22:
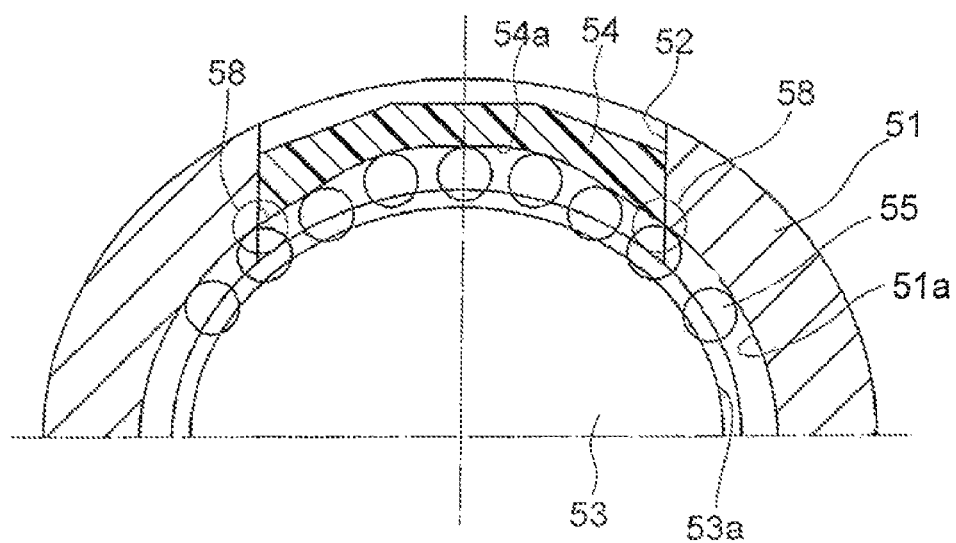
FIG. 22 is a cross sectional view of the nut taken along the return groove of the deflector.

FIG. 22 shows a cross section of the nut 51 taken along the return groove 54a of the deflector 54. In this embodiment, the deflector 54 is formed integral with the deflector hole 52 of the nut 51 so that no elevation change is formed at the joint 58 of the return groove 54a of the deflector 54 and the loaded ball rolling groove 51a of the nut 51. As it is described in detail later, an inner die and an outer die are mounted on the inner side and the outer side, respectively, of the deflector hole 52 of the nut 51 and molten resin is injected into the deflector hole 52. Then, the deflector 54 is formed integral with the deflector hole 52. Therefore, there is no space formed between the outer peripheral surface of the deflector 54 and the inner peripheral surface of the deflector hole 52.

Figure 23:
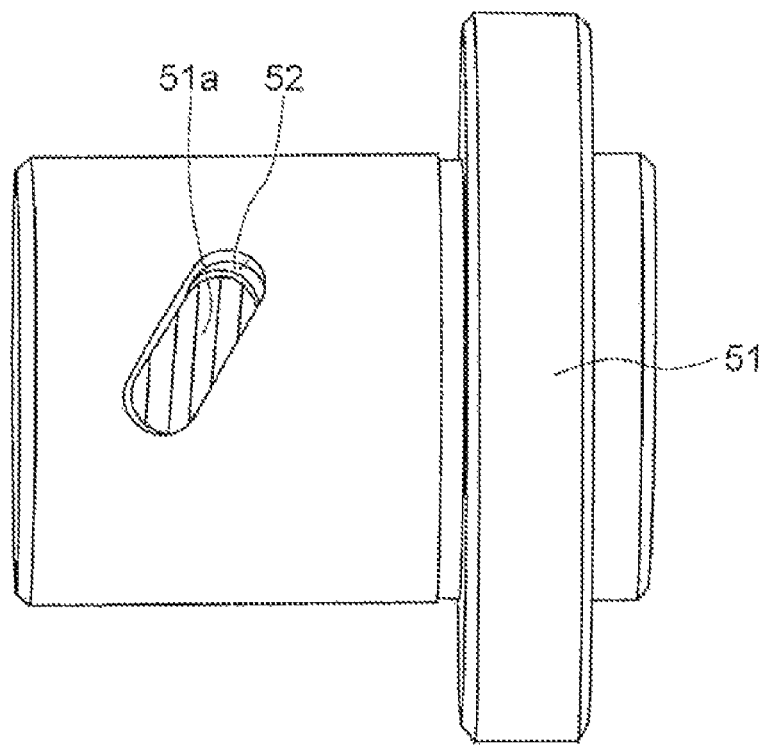
FIG. 23 is a perspective view of the nut having a deflector hole formed therein.
Figure 24:
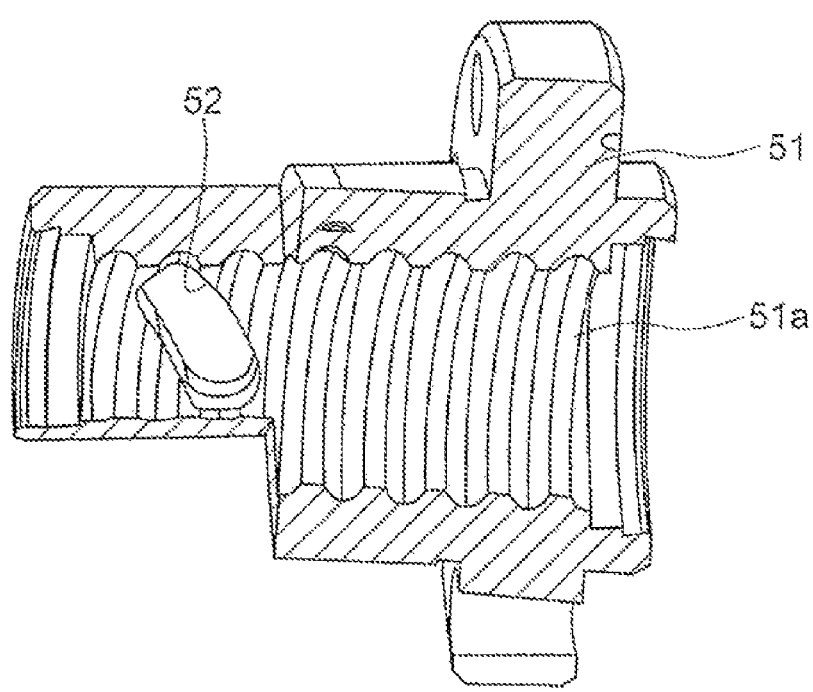
FIG. 24 is a cross sectional view of the nut having a deflector hole formed therein.

Next description is made about a method for manufacturing the above-described nut 51. First, as shown in FIGS. 23 and 24, the loaded ball rolling groove 51a is formed on the inner peripheral surface of the nut 51. After the loaded ball rolling groove 51a of the nut 51 is formed, the deflector hole 52 is formed at a circumferential part of the nut 51 as penetrating from the outer peripheral surface to the inner peripheral surface with use of a cutting tool such as an end mill. The plane surface of the deflector hole 52 has a rectangular center part and semicircular end parts. The deflector hole 52 is formed over adjacent loaded ball rolling grooves 51a. In order that each ball 55 moving in the loaded ball rolling groove 51a does not change its directions suddenly, the deflector hole 52 is inclined with respect to the axial direction of the nut 51. Here, as shown in FIG. 24, for easy understanding of the deflector hole 52 of the nut 51, a circumferential part of the nut 51 is only shown, however, the nut 51 is actually shaped like a cylinder as shown in FIG. 23.

Figure 25:
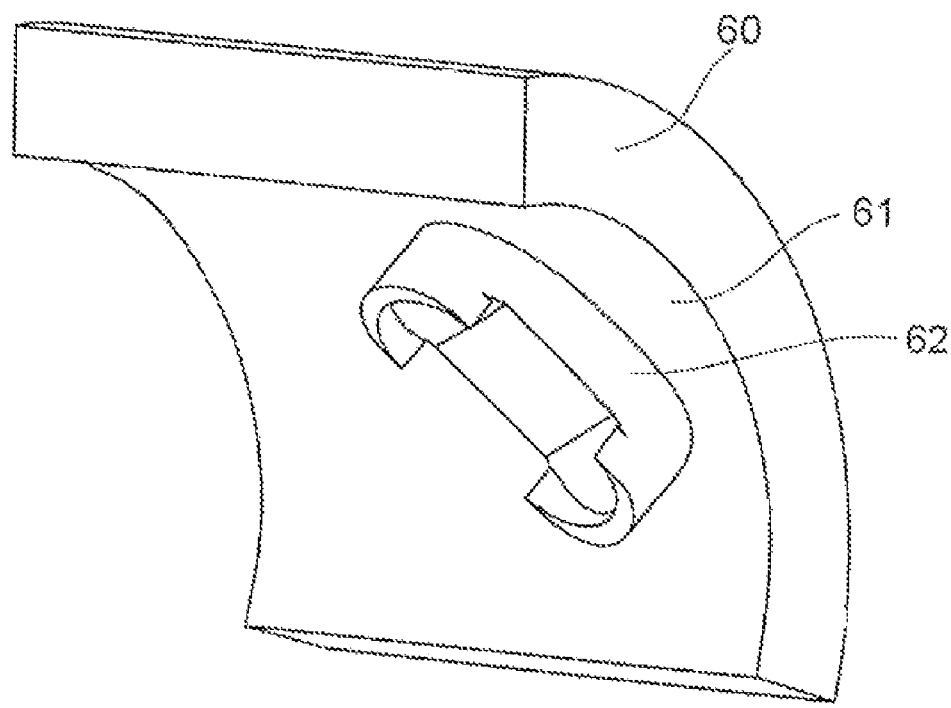
FIG. 25 is a perspective view of an outer die.
Figure 26:
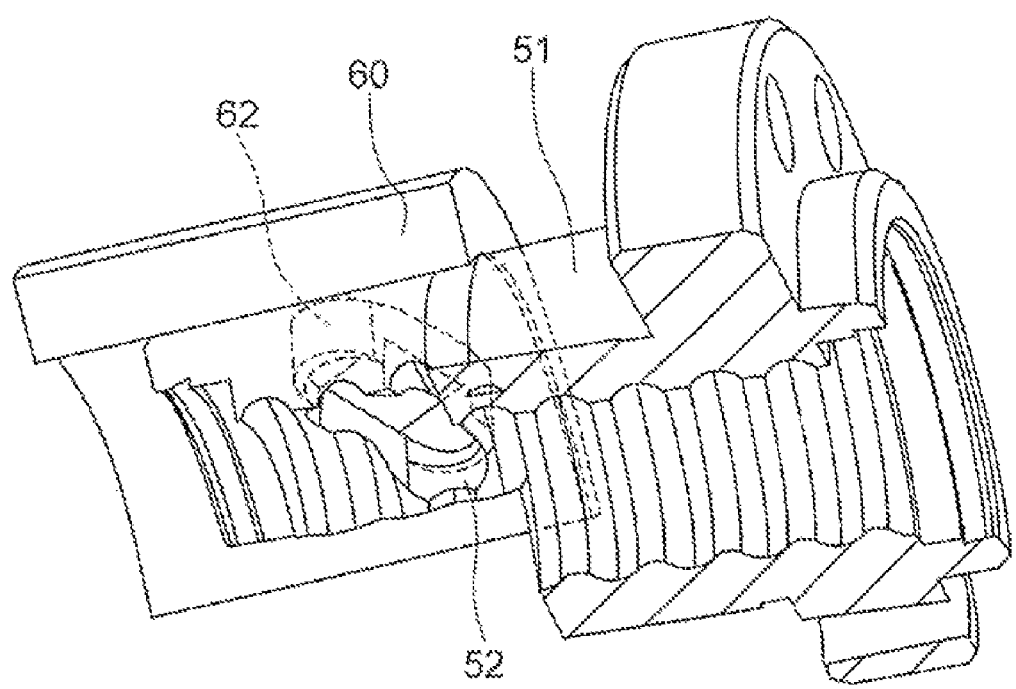
FIG. 26 is a view showing the outer die fit on the nut.

FIG. 25 shows an outer die 60 mounted on the outer peripheral surface of the nut 51. The outer die 60 has a cylindrical nut contact surface 61 conforming to the shape of the outer peripheral surface of the nut 51, and a hole fitting convex part 62 conforming to the shape of the deflector hole 52 of the nut 51. As shown in FIG. 26, the hole fitting convex part 62 of the outer die 60 is fit into the deflector hole 52 of the nut 51 thereby to position the outer die 60 relative to the nut 51.

Figure 27:
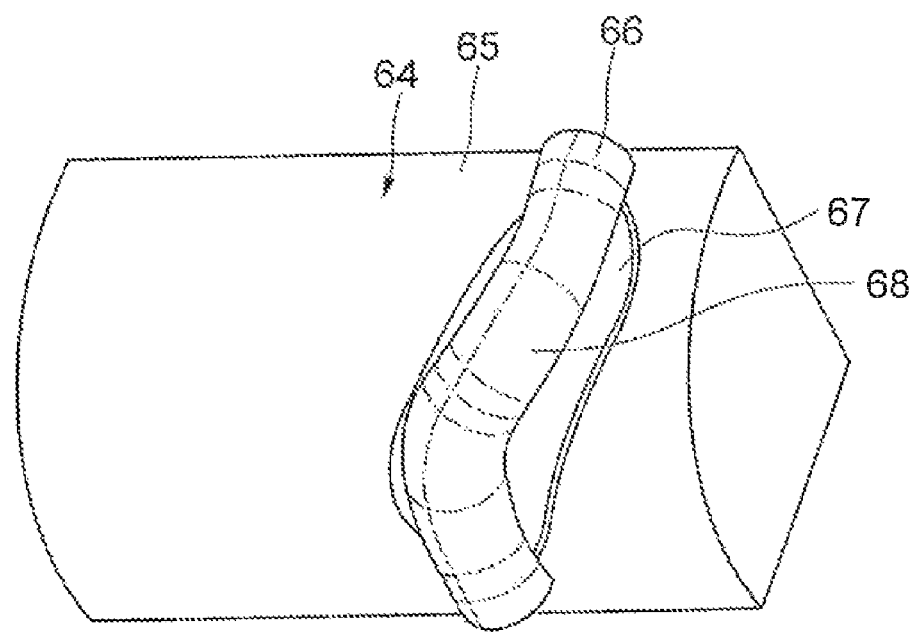
FIG. 27 is a perspective view of an inner die.

FIG. 27 shows an inner die 64 mounted on the inner side of the nut 51. The inner die 64 has a nut contact surface 65 which can be in contact with the inner peripheral surface of the nut 51, a groove fitting convex part 66 conforming to the shape of the loaded ball rolling groove 51a of the nut 51, a hole fitting convex part 67 which is raised or bulges from the nut contact surface 65 and fit inside the deflector hole 52 of the nut 51, and a return groove convex part 68 provided inside the hole fitting convex part 67 to form the return groove 54a of the deflector 54. The groove fitting convex part 66 and the return groove convex part 68 are formed to be continuous. Further, the inner die 64 has a leakproof convex part (not shown) for preventing molten resin injected in the deflector hole 52 from leaking from the loaded ball rolling groove 51a of the nut 51 (a part where the wing part 54b is fit and so on).

Figure 28:
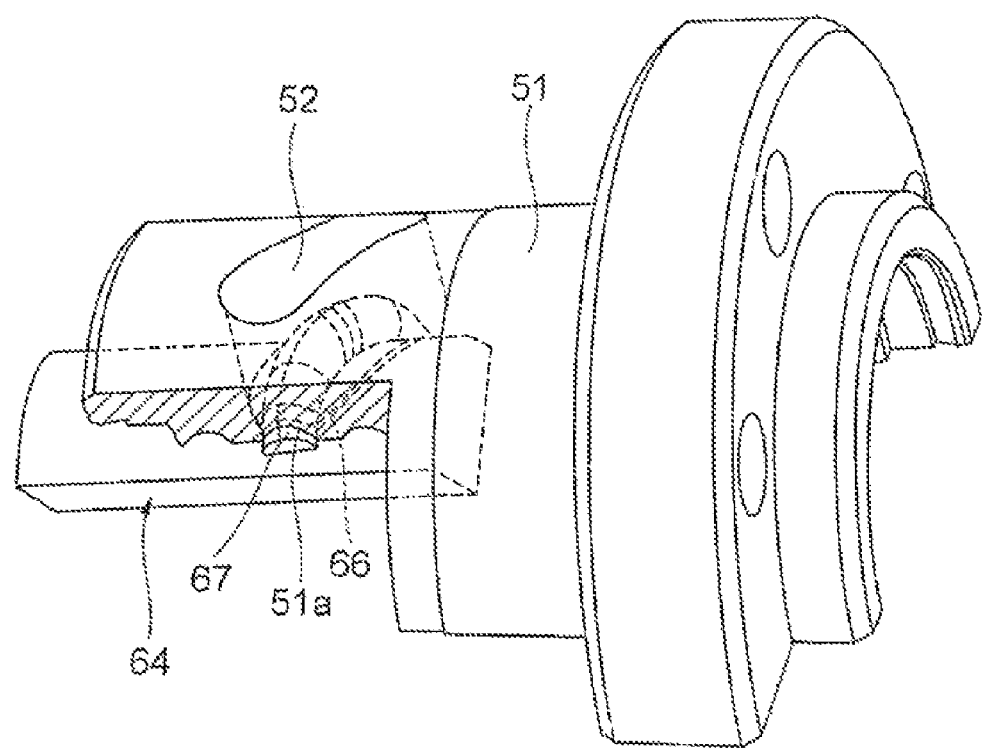
FIG. 28 is a view showing the inner die fit on the nut.

As shown in FIG. 28, the hole fitting convex part 67 of the inner die 64 is fit into the deflector hole 52 of the nut 51 and the groove fitting convex part 66 of the inner die 64 is fit into the loaded ball rolling groove 51a of the nut 51, and then, the inner die 64 can be positioned relative to the nut 51. If the inner die 64 cannot be positioned relative to the nut 51, the return groove 54a cannot be positioned at the right position.

Figure 29:
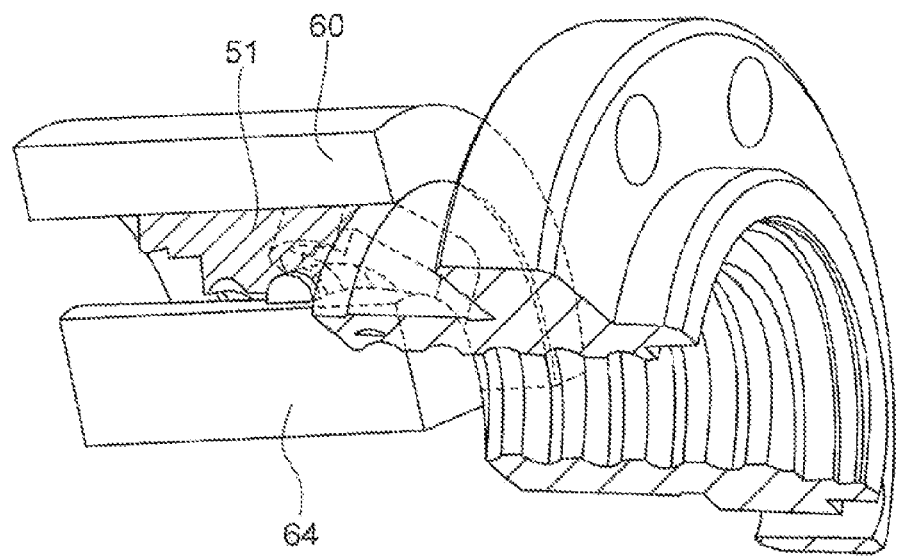
FIG. 29 is a view showing the inner die and the outer die fit on the nut.
Figure 30:
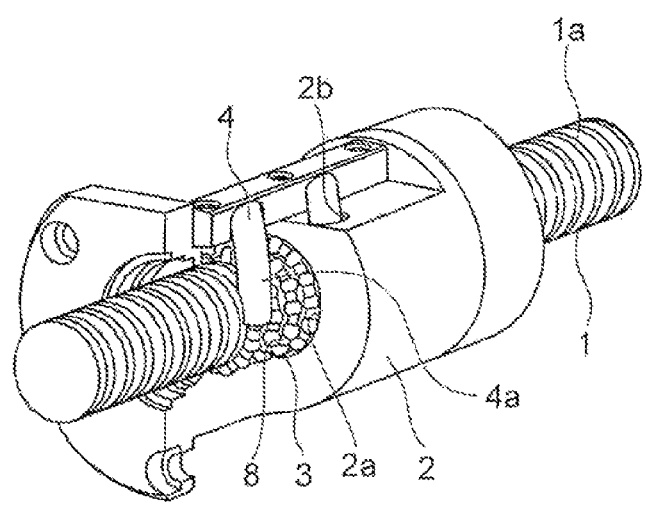
FIG. 30 is a perspective view illustrating a conventional ball screw.
Figure 31:
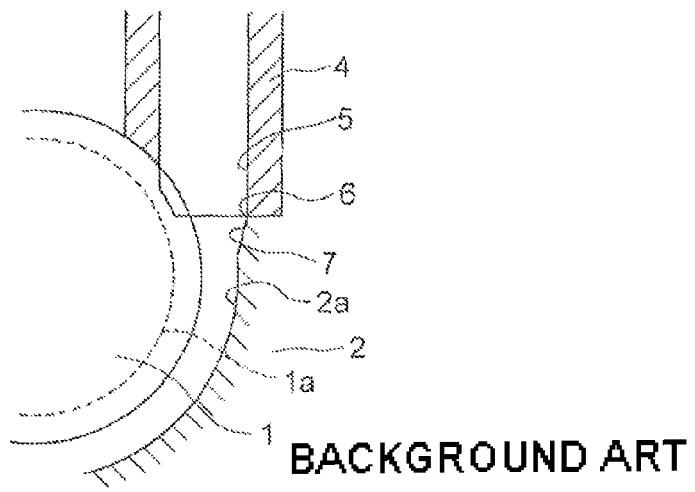
FIG. 31 is a cross sectional view showing a connecting part of a ball return path and a loaded ball rolling groove.
Figure 32:
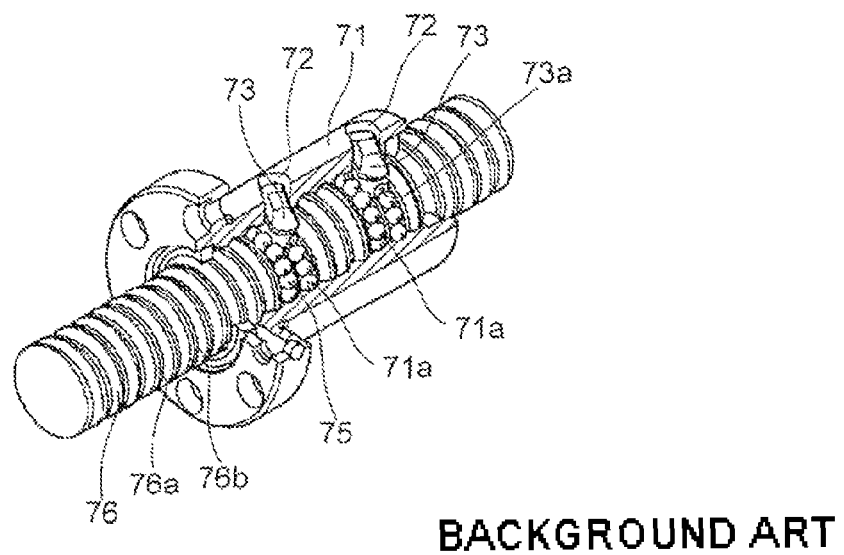
FIG. 32 is a perspective view of a conventional deflector type ball screw.
Figure 33:
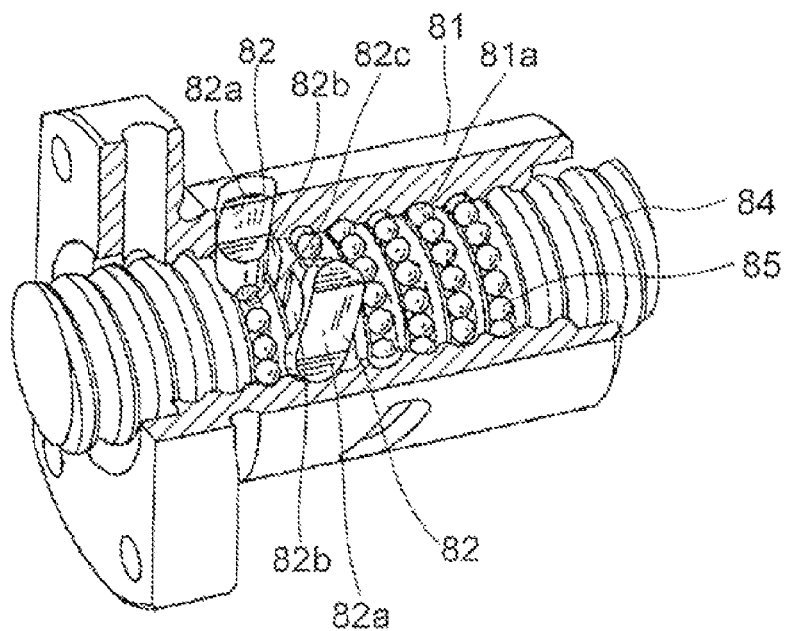
FIG. 33 is a perspective view showing a conventional wing deflector type ball screw.
Figure 34:
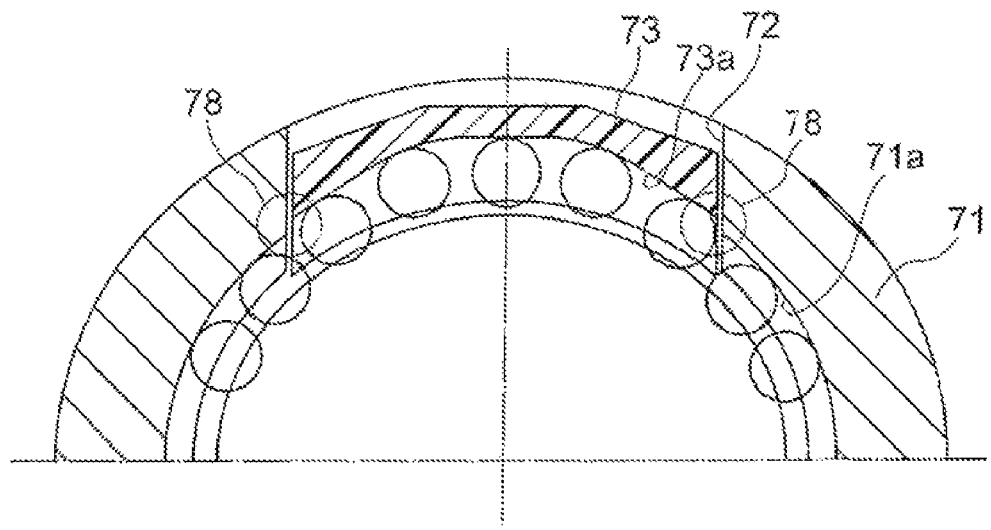
FIG. 34 is a cross sectional view of the conventional deflector type ball screw.
Figure 35:
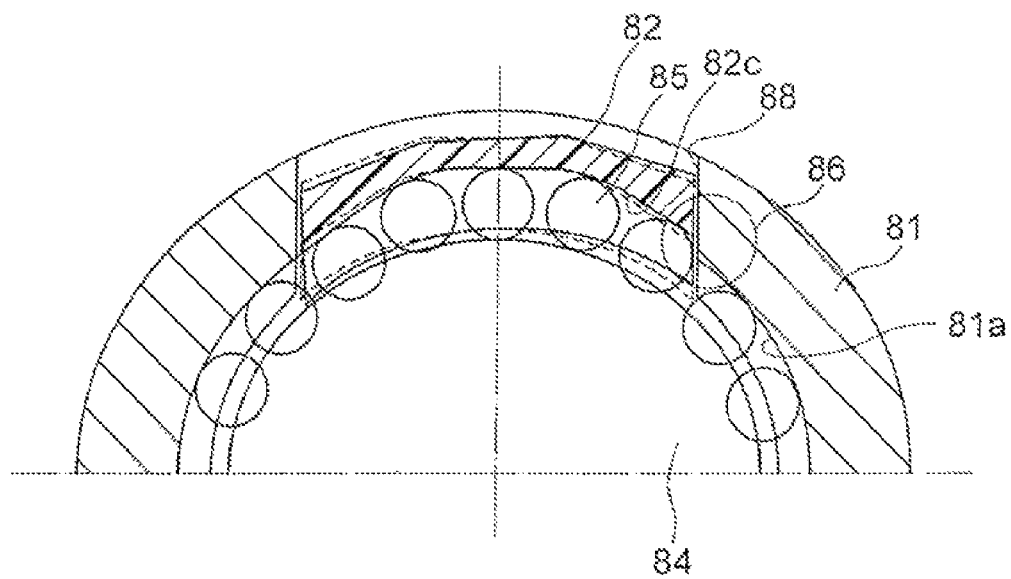
FIG. 35 is a cross sectional view of the conventional wing deflector type ball screw.

FIG. 29 shows the inner die 64 and the outer die 60 mounted on the inner peripheral side and outer peripheral side, respectively, of the nut 51. After the nut 51 is moved axially and rotated, the nut 51 is sandwiched between the inner die 64 and the outer die 60. As the outer die 60 and the inner die 64 are provided with the hole fitting convex parts 62 and 67, respectively, which are fit into the deflector holes 52 of the nut 51, both the inner die 64 and the outer die 60 can be positioned relative to the nut 51. One of the inner die 64 and the outer die 60 is provided with a gate. As molten resin is injected into the deflector hole 52 via the gate, the deflector 54 can be molded inside the deflector hole 52. As there is a need to remove the inner die 64 and the outer die 60 from the nut 51 after molding, the inner die 64 and the outer die 60 are shaped like axial splits of the cylindrical column, not like an approximately cylindrical column.

Here, in the above-described manufacturing method of the nut 51, the deflector hole 52 is formed passing through the nut 11 from the inner peripheral surface to the outer peripheral surface. However, the deflector hole 52 may be a blind hole extending from the inner peripheral surface of the nut 51 to a radially halfway to the outer side of the nut 51. In this case, the outer die 60 is omitted and the deflector 54 can be formed only with the inner die 64.

The present invention is not limited to the above-described embodiments, but may be embodied in various forms without departing from the scope of the invention. For example, as rolling elements, the balls 55 may be replaced with rollers. Resin molding may be replaced with MIM (Metal Injection Molding) that is injection molding with a mixture of metal powder particles and binders with use of a die.

The present specification is based on Japanese Patent Applications No. 2006-124953 filed on Apr. 28, 2006 and No. 2007-091161 filed on Mar. 30, 2007, the entire contents of which are expressly incorporated by reference herein.

The invention claimed is:
1. A screw device comprising:
a screw shaft having an outer peripheral surface with a rolling-element rolling groove spirally formed thereon;
a nut having an inner peripheral surface with a loaded rolling-element rolling groove spirally formed thereon facing the rolling-element rolling groove of the screw shaft;

a circulation member having a rolling-element return path connecting one end of the loaded rolling-element rolling groove of the nut with an opposite end thereof; and a plurality of rolling elements arranged in the rolling-element return path of the circulation member and a loaded rolling-element rolling path between the rolling-element rolling groove of the screw shaft and the loaded rolling-element rolling groove of the nut, the rolling elements rolling in the loaded rolling-element rolling path, being scooped up at an end part of the circulation member and returned into the loaded rolling-element rolling path by an opposite end part of the circulation member, the end part of the circulation member having a periphery including a rolling groove connecting part which is positioned to a side of the loaded rolling-element rolling groove of the nut and connected to the loaded rolling-element rolling groove of the nut and a scooping part which is positioned to a side of the rolling-element rolling groove of the screw shaft and scoops up the rolling elements from the loaded rolling-element rolling path, the nut having a side surface having a through hole formed therein which reaches the loaded rolling-element rolling groove of the nut, the rolling groove connecting part of the end part of the circulation member being made of resin and mold-formed integral with an inner peripheral surface of the through hole in the nut with no space formed therebetween, the scooping part of the end part of the circulation member being made of resin and formed integral with the rolling groove connecting part, and a space being formed between the inner peripheral surface of the through hole and an outer peripheral surface of the scooping part of the end part by drawing a die out.

2. The screw device according to claim 1, wherein each of the end parts juts from the through hole, the circulation member has a connecting part which connects the end parts of the circulation member each jutting from the through hole, and the connecting part has a connecting return path formed therein connecting rolling-element return paths of the end parts.

3. The screw device according to claim 1, wherein a spacer is interposed to prevent contact between the rolling elements.

4. The screw device according to claim 1, wherein the circulation member is a deflector mounted on the nut for returning the rolling elements on the loaded rolling-element rolling path one turn back to the rolling element rolling groove, the nut has a deflector hole formed therein which reaches the loaded rolling-element rolling groove of the nut, and at least the rolling groove connecting part of the end part of the deflector is formed integral with an inner surface of the deflector hole.

5. A method of manufacturing a screw device having: a screw shaft having an outer peripheral surface with a rolling-element rolling groove spirally formed thereon; a nut having an inner peripheral surface with a loaded rolling-element rolling groove spirally formed thereon facing the rolling-element rolling groove of the screw shaft; a circulation member having a rolling-element return path connecting one end of the loaded rolling-element rolling groove of the nut with an opposite end thereof; and a plurality of rolling elements arranged in the rolling-element return path of the circulation member and a loaded rolling-element rolling path between the rolling-element rolling groove of the screw shaft and the loaded rolling-element rolling groove of the nut, the rolling elements rolling in the loaded rolling-element rolling path, being scooped up at an end part of the circulation member and returned into the loaded rolling-element rolling path by an opposite end part of the circulation member, the end part of the circulation member having an periphery including a rolling groove connecting part which is positioned to a side of the loaded rolling-element rolling groove of the nut and connected to the loaded rolling-element rolling groove of the nut and a scooping part which is positioned to a side of the rolling-element rolling groove of the screw shaft and scoops up the rolling elements from the loaded rolling-element rolling path, the method comprising:

inserting the nut into a die to form at least the rolling groove connecting part of the end part integral with the nut by resin insert molding, the die including a pin shaped die which is inserted in a through hole formed in a side surface of the nut to form the rolling-element return path of the end part of the circulation member.

6. The method according to claim 5, wherein the scooping part of the end part of the circulation member is formed integral with the rolling groove connecting part with resin.

7. The method according to claim 5, wherein the die includes a nut inside die which is placed inside the nut to form the end part of the circulation member jutting inside the nut.

8. A method of manufacturing a nut having an inner peripheral surface with a loaded rolling-element rolling groove of less than one turn spirally formed thereon in such a manner as to be integral with a deflector of resin having a return groove connecting one end of the loaded rolling-element rolling groove of less than one turn of the nut with an opposite end thereof, the method comprising:

a deflector hole forming step of forming in the nut a deflector hole which conforms to a shape of the deflector;

a die mounting step of inserting into the nut an inner die having a hole fitting convex part which conforms to a shape of the deflector hole of the nut and a return groove convex part which is provided in the hole fitting convex part to form the return groove of the deflector, and of fitting the hole fitting convex part of the inner die into the deflector hole of the nut; and a forming step of performing injection-molding of resin in the deflector hole of the nut to which the inner die is inserted.

9. A method of manufacturing a nut having an inner peripheral surface with a loaded rolling-element rolling groove of less than one turn spirally formed thereon in such a manner as to be integral with a deflector of resin having a return groove connecting one end of the loaded rolling-element rolling groove of less than one turn of the nut with an opposite end thereof, the method comprising:

a deflector hole forming step of forming in the nut a deflector hole which conforms to a shape of the deflector;

a die mounting step of inserting into the nut an inner die having a groove fitting convex part which conforms to a shape of the loaded rolling-element rolling groove of the nut and a return groove convex part which is continuous to the groove fitting convex part and is for forming the return groove of the deflector, and of fitting the groove fitting convex part of the inner die into the loaded rolling-element rolling groove of the nut; and a forming step of performing injection-molding of resin in the deflector hole of the nut to which the inner die is inserted, wherein in the deflector hole forming step, the deflector hole is formed passing through the nut from an inner peripheral side to an outer peripheral side thereof; in the die mounting step, an outer die is mounted on an outer side of the nut; and in the forming step, the resin is injected into the deflector hole of the nut on which the inner die and the outer die are mounted.

10. A method of manufacturing a screw device having: a screw shaft having an outer peripheral surface with a rolling-element rolling groove spirally formed thereon; a nut having an inner peripheral surface with a loaded rolling-element rolling groove spirally formed thereon facing the rolling-element rolling groove of the screw shaft; a circulation member having a rolling-element return path connecting one end of the loaded rolling-element rolling groove of the nut with an opposite end thereof; and a plurality of rolling elements arranged in the rolling-element return path of the circulation member and a loaded rolling-element rolling path between the rolling-element rolling groove of the screw shaft and the loaded rolling-element rolling groove of the nut, the rolling elements rolling in the loaded rolling-element rolling path, being scooped up at an end part of the circulation member and returned into the loaded rolling-element rolling path by an opposite end part of the circulation member, the end part of the circulation member having a periphery including a rolling groove connecting part which is positioned to a side of the loaded rolling-element rolling groove of the nut and connected to the loaded rolling-element rolling groove of the nut and a scooping part which is positioned to a side of the rolling-element rolling groove of the screw shaft and scoops up the rolling elements from the loaded rolling-element rolling path, the method comprising:

inserting the nut into a die to form at least the rolling groove connecting part of the end part integral with the nut by resin insert molding, the die including a cross-sectionally arc shaped die which is inserted in a through hole formed in a side surface of the nut to form a scooping-part-side outer peripheral surface of an outer peripheral surface of the end part of the circulation member.

11. The method according to claim 10, wherein the scooping part of the end part of the circulation member is formed integral with the rolling groove connecting part with resin.

12. The method according to claim 10, wherein the die includes a nut inside die which is placed inside the nut to form the end part of the circulation member jutting inside the nut.

13. A method of manufacturing a screw device having: a screw shaft having an outer peripheral surface with a rolling-element rolling groove spirally formed thereon; a nut having an inner peripheral surface with a loaded rolling-element rolling groove spirally formed thereon facing the rolling-element rolling groove of the screw shaft; a circulation member having a rolling-element return path connecting one end of the loaded rolling-element rolling groove of the nut with an opposite end thereof; and a plurality of rolling elements arranged in the rolling-element return path of the circulation member and a loaded rolling-element rolling path between the rolling-element rolling groove of the screw shaft and the loaded rolling-element rolling groove of the nut, the rolling elements rolling in the loaded rolling-element rolling path, being scooped up at an end part of the circulation member and returned into the loaded rolling-element rolling path by an opposite end part of the circulation member, the end part of the circulation member having a periphery including a rolling groove connecting part which is positioned to a side of the loaded rolling-element rolling groove of the nut and connected to the loaded rolling-element rolling groove of the nut and a scooping part which is positioned to a side of the rolling-element rolling groove of the screw shaft and scoops up the rolling elements from the loaded rolling-element rolling path, the method comprising:

inserting the nut into a die to form at least the rolling groove connecting part of the end part integral with the nut by resin insert molding; and after forming the rolling groove connecting part of the end part of the circulation member of resin and integral with the nut, subjecting the rolling groove connecting part and the loaded rolling-element rolling groove of the nut to cutting and grinding.

14. The method according to claim 13, wherein the scooping part of the end part of the circulation member is formed integral with the rolling groove connecting part with resin.

15. The method according to claim 13, wherein a through hole is formed in a side surface of the nut so as to reach the loaded rolling-element rolling groove of the inner peripheral surface of the nut, and at least the rolling groove connecting part of the end part of the circulation member is formed integral with an inner surface of the through hole.

16. The method according to claim 13, wherein the die includes a nut inside die which is placed inside the nut to form the end part of the circulation member jutting inside the nut.

* * * * *